United States Patent
Fujimoto

(10) Patent No.: US 11,516,468 B2
(45) Date of Patent: Nov. 29, 2022

(54) IMAGE DECODING DEVICE, IMAGE DECODING METHOD, IMAGE ENCODING DEVICE, AND IMAGE ENCODING METHOD

(71) Applicant: Sony Group Corporation, Tokyo (JP)

(72) Inventor: Yuji Fujimoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/429,354

(22) PCT Filed: Mar. 12, 2020

(86) PCT No.: PCT/JP2020/010879
§ 371 (c)(1),
(2) Date: Aug. 9, 2021

(87) PCT Pub. No.: WO2020/184672
PCT Pub. Date: Sep. 17, 2020

(65) Prior Publication Data
US 2022/0150469 A1     May 12, 2022

Related U.S. Application Data

(60) Provisional application No. 62/817,197, filed on Mar. 12, 2019.

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/172* (2014.11); *H04N 19/188* (2014.11); *H04N 19/70* (2014.11)

(58) Field of Classification Search
CPC .. H04N 19/105; H04N 19/159; H04N 19/172; H04N 19/188; H04N 19/58; H04N 19/70
See application file for complete search history.

(56) References Cited

U.S. PATENT DOCUMENTS

| 2007/0223595 A1 | 9/2007 | Hannuksela et al. |
| 2018/0014010 A1* | 1/2018 | Dai ........................ H04N 19/59 |

FOREIGN PATENT DOCUMENTS

| JP | 2010-10959 A | 1/2010 |
| JP | 2015-509345 A | 3/2015 |
| WO | WO-2020185150 A1 * | 9/2020 ........... H04N 19/172 |

OTHER PUBLICATIONS

Thang et al. ("On NAL unit header", Joint Collaborative Team on Video Coding (JCT-VC) of ITU-T SG16 WP3 and ISO/IEC JTC 1/SC 29/WG 119th Meeting: Geneva, CH, Apr. 27 to May 7, 2012, [JCTVC-10251]) (Year: 2012).*

(Continued)

Primary Examiner — Maria E Vazquez Colon
(74) Attorney, Agent, or Firm — Xsensus LLP

(57) ABSTRACT

The present disclosure relates to an image decoding device, an image decoding method, an image encoding device, and an image encoding method that enable further improvement of practicality.
Reference image information indicating a reference image to be referred to by a current picture is saved in a header region of an access unit. The reference image information is saved in an AUD NAL unit indicating a delimiter of the access unit or a NEW NAL unit provided separately from the AUD NAL unit, and is applied to all tile group NAL units in the access unit. The present technology can be applied to, for example, an image decoding device and an image encoding device.

9 Claims, 25 Drawing Sheets

| REF | Document | | | | |
|---|---|---|---|---|---|
| 1 | Recommendation | ITU-TH.264 | "Advanced video coding for generic audiovisual services", | | 2017 Apr |
| 2 | Recommendation | ITU-TH.265 | "High efficiency video coding", | | 2016 Dec |
| 3 | | | ISO/IEC 14496-12:2015 | Information technology. Coding of audio-visual objects.Part 12 | |
| 4 | | | ISO/IEC 14496-15:2014 | Information technology-Coding of audio-visual objects-Part 15:Carriage of network abstraction layer(NAL)unit structured video in the ISO base media file format | |
| 5 | | ITU-T Rec.H.264 | ISO/IEC 14496-10 | Advanced Video Coding | |
| 6 | JVET-M1001 | m46627 | Versatile Video Coding(Draft 4) | B. Bross, J. Chen, S. Liu(editors) | Joint Video Experts Team(JVET)of ITU-T SG 16 WP 3 and ISO/IEC JTC 1/SC 29/WG 11 13th Meeting:Marrakech, MA, 9-18 Jan. 2019 |

(51) Int. Cl.
  *H04N 19/172* (2014.01)
  *H04N 19/169* (2014.01)
  *H04N 19/70* (2014.01)

(56) References Cited

OTHER PUBLICATIONS

Bross et al. ("Versatile Video Coding (Draft 4)", Joint Video Experts Team (JVET) of ITU-T SG16 WP3 and ISO/IEC JTC 1/SC 29/WG11 13th Meeting: Marrakech, MA Jan. 9-18, 2019, [JVET-M1001-v6]) (Year: 2019).*
International Search Report and Written Opinion dated Jun. 9, 2020, received for PCT Application PCT/JP2020/010879, Filed on Mar. 12, 2020, 11 pages including English Translation.
Bross et al., "Versatile Video Coding (Draft 4)", Joint Video Experts Team (JVET) of ITU-T SG 16 WP 3 and ISO/IEC JTC 1/SC 29/WG 11, JVET-M1001-v6, Jan. 9-18, 2019, pp. 1-284.
Hannuksela, "Hooks for Scalable Extensions", Joint Collaborative Team on Video Coding (JCT-VC) of ITU-T SG16 WP3 and ISO/IEC JTC1/SC29/WG11, JCTVC-H0701r1, Feb. 1-10, 2012, pp. 1-10.
Thang et al., "On NAL Unit Header", Joint Collaborative Team on Video Coding (JCT-VC) of ITU-T SG 16 WP 3 and ISO/IEC JTC 1/SC 29/WG 11, JCTVC-10251, Apr. 27-May 7, 2012, pp. 1-3.

\* cited by examiner

FIG. 1

| REF | Document | | | |
|---|---|---|---|---|
| 1 | Recommendation | ITU-T H.264 | "Advanced video coding for generic audiovisual services", | 2017 Apr |
| 2 | Recommendation | ITU-T H.265 | "High efficiency video coding", | 2016 Dec |
| 3 | | | Information technology. Coding of audio-visual objects. Part 12 ISO/IEC 14496-12:2015 | |
| 4 | | | Information technology-Coding of audio-visual objects-Part 15:Carriage of network abstraction layer(NAL)unit structured video in the ISO base media file format ISO/IEC 14496-15:2014 | |
| 5 | | ITU-T Rec. H.264 | Advanced Video Coding ISO/IEC 14496-10 | |
| 6 | JVET-M1001 | m46627 | Versatile Video Coding(Draft 4) B.Bross,J.Chen,S.Liu(editors) | Joint Video Experts Team(JVET)of ITU-T SG 16 WP 3 and ISO/IEC JTC 1/SC 29/WG 11 13th Meeting:Marrakech,MA,9-18 Jan. 2019 |

FIG. 4
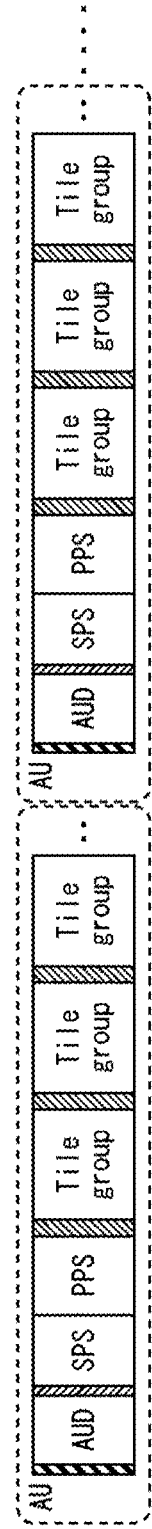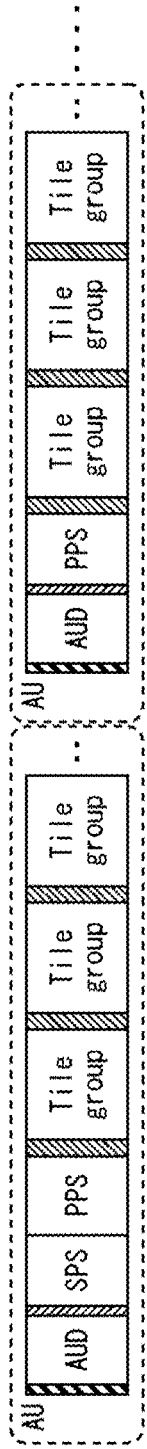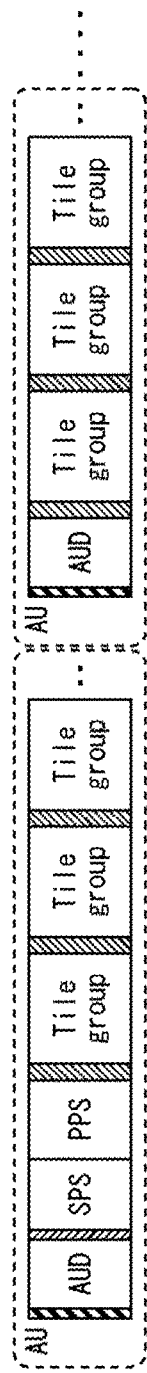

FIG. 5

| | Descriptor |
|---|---|
| access_unit_delimiter_rbsp( ) { | |
|   pic_type | u(3) |
|   if( pic_type != 0 ) { | |
|     for( i = 0; i < 2; i++ ) { | |
|       if( num_ref_pic_lists_in_sps[ i ] > 0 && | |
|         ( i == 0 || ( i == 1 && rpl1_idx_present_flag ) ) ) | |
|       ref_pic_list_sps_flag[ i ] | u(1) |
|       if( ref_pic_list_sps_flag[ i ] ) { | |
|         if( num_ref_pic_lists_in_sps[ i ] > 1 && | |
|           ( i == 0 || ( i == 1 && rpl1_idx_present_flag ) ) ) | |
|         ref_pic_list_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         delta_poc_msb_present_flag[ i ][ j ] | u(1) |
|         if( delta_poc_msb_present_flag[ i ][ j ] ) | |
|           delta_poc_msb_cycle_lt[ i ][ j ] | ue(v) |
|       } | |
|     } | |
|   } | |
|   rbsp_trailing_bits( ) | |
| } | |

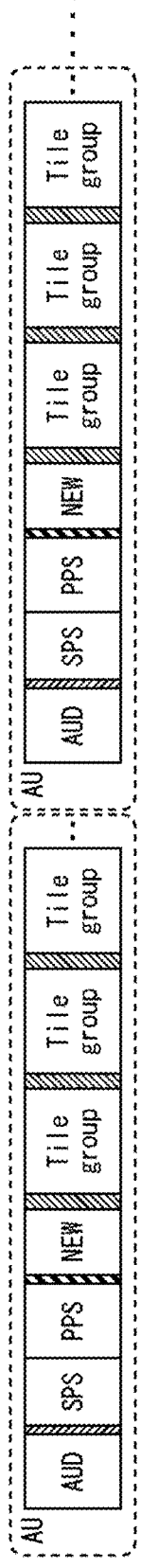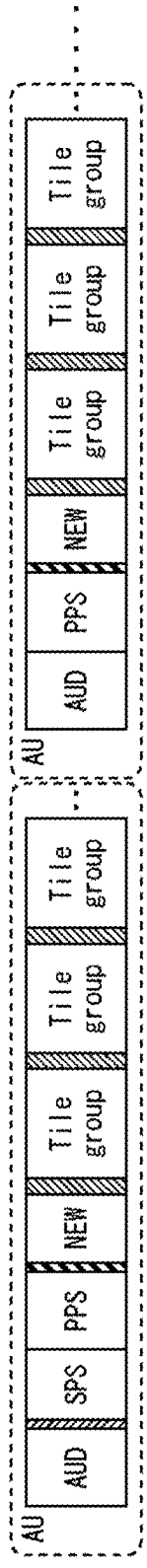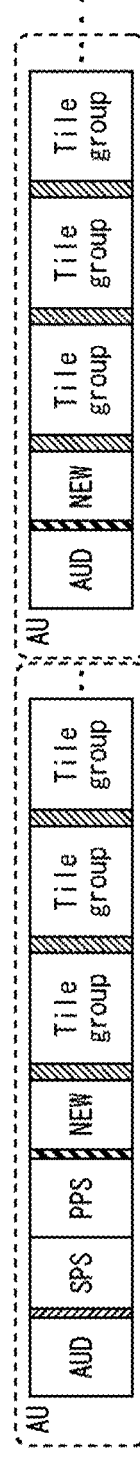
FIG. 12

FIG. 13

| | Descriptor |
|---|---|
| new_type_rbsp( ) { | |
|   if( pic_type != 0 ) { | |
|     for( i = 0; i < 2; i++ ) { | |
|       if( num_ref_pic_lists_in_sps[ i ] > 0 && | |
|         ( i == 0 || ( i == 1 && rpl1_idx_present_flag ) ) ) | |
|         ref_pic_list_sps_flag[ i ] | u(1) |
|       if( ref_pic_list_sps_flag[ i ] ) { | |
|         if( num_ref_pic_lists_in_sps[ i ] > 1 && | |
|           ( i == 0 || ( i == 1 && rpl1_idx_present_flag ) ) ) | |
|           ref_pic_list_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         delta_poc_msb_present_flag[ i ][ j ] | u(1) |
|         if( delta_poc_msb_present_flag[ i ][ j ] ) | |
|           delta_poc_msb_cycle_lt[ i ][ j ] | ue(v) |
|       } | |
|     } | |
|   } | |
|   rbsp_trailing_bits( ) | |
| } | |

FIG. 19
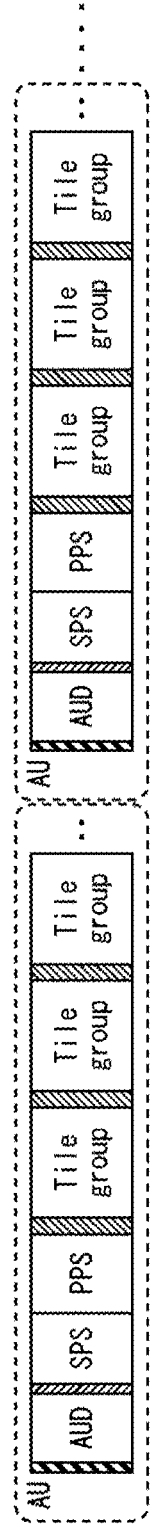
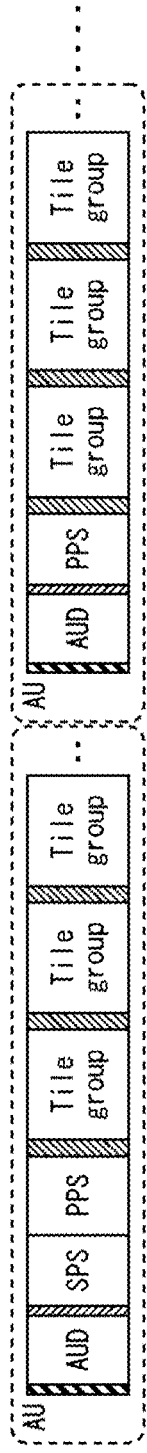
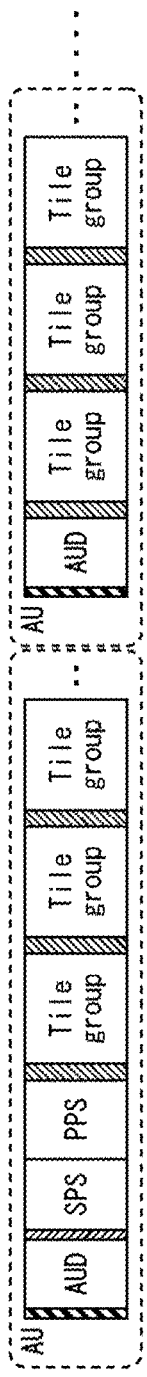
- AUD IS EXTENDED SUCH THAT ONLY SETTING FOR Long Term CAN BE INDEPENDENTLY MODIFIED
- CASE WHERE SPS AND PPS ARE ALLOCATED TO EACH AU
- CASE WHERE SPS IS ALLOCATED TO AU AT BEGINNING, AND PPS IS ALLOCATED TO EACH AU
- CASE WHERE SPS AND PPS ARE ALLOCATED TO AU AT BEGINNING
▨ modify poc_lsb_lt of ref_pic_list_struct(i, ref_pic_list_idx[i])
▨ ref_pic_list_struct
▨ tile_group_header

FIG. 20

SPS

| | |
|---|---|
| long_term_ref_pics_flag | u(1) |
| if( long_term_ref_pics_flag ) | |
|   ltrp_modification_enable_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|   for( j = 0; j < num_ref_pic_lists_in_sps[ i ]; j++ ) | |
|     ref_pic_list_struct( i, j ) | |
| } | |

AUD

| | |
|---|---|
| access_unit_delimiter_rbsp( ) { | Descriptor |
|   pic_type | u(3) |
|   if( pic_type != 0 ) { | |
|     for( i = 0; i < 2; i++ ) { | |
|       if( num_ref_pic_lists_in_sps[ i ] > 0 && | |
|         ( i == 0 || ( i == 1 && rpl1_idx_present_flag ) ) ) | |
|       ref_pic_list_sps_flag[ i ] | u(1) |
|       if( ref_pic_list_sps_flag[ i ] ) { | |
|         if( num_ref_pic_lists_in_sps[ i ] > 1 && | |
|           ( i == 0 || ( i == 1 && rpl1_idx_present_flag ) ) ) | |
|         ref_pic_list_idx[ i ] | u(v) |
|         if( ltrp_modification_enable_flag ){ | |
|           ltrp_modificaion_flag[ i ] | u(1) |
|           if( ltrp_modification_flag[ i ] ){ | |
|             for( j = 0; j < NumLtrpEntries[ i ][ RplsIdx[ i ] ]; j++ ) { | |
|               poc_lsb_lt[ i ][ j ] | u(v) |
|             } | |
|           } | |
|         } | |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         delta_poc_msb_present_flag[ i ][ j ] | u(1) |
|         if( delta_poc_msb_present_flag[ i ][ j ] ) | |
|           delta_poc_msb_cycle_lt[ i ][ j ] | ue(v) |
|       } | |
|     } | |
|   } | |
|   rbsp_trailing_bits( ) | |
| } | |

FIG. 21
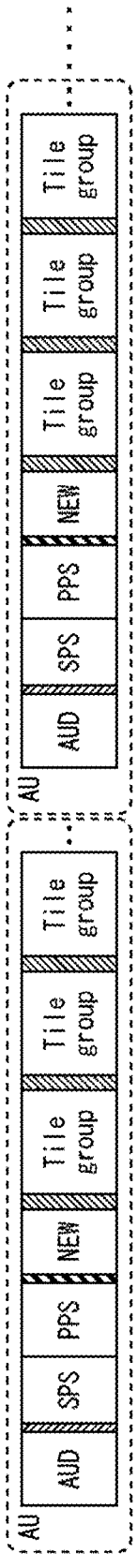
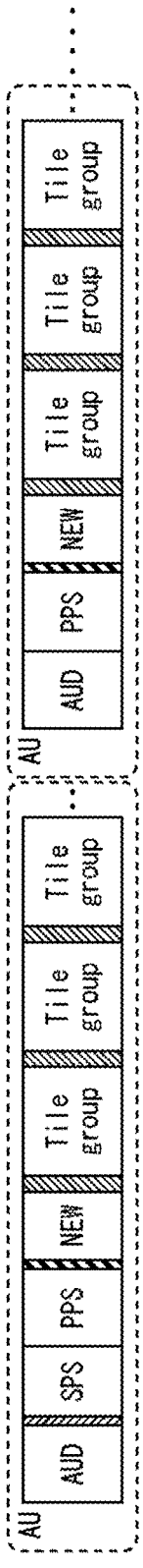
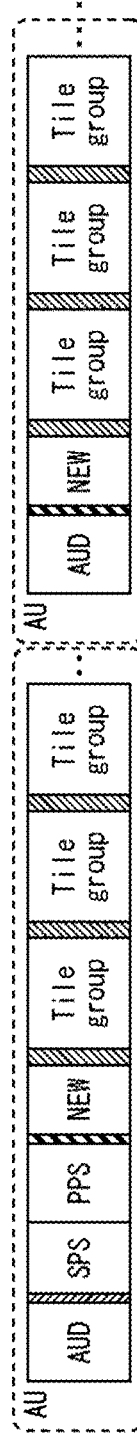

FIG. 22

SPS

| | |
|---|---|
| long_term_ref_pics_flag | u(1) |
| if( long_term_ref_pics_flag ) | |
|   ltrp_modification_enable_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |

New type NAL

| new_type_rbsp( ) { | Descriptor |
|---|---|
|   pic_type | u(3) |
|   if( pic_type != 0 ) { | |
|     for( i = 0; i < 2; i++ ) { | |
|       if( num_ref_pic_lists_in_sps[ i ] > 0 && | |
|         ( i == 0 || ( i == 1 && rpl1_idx_present_flag ) ) ) | |
|       ref_pic_list_sps_flag[ i ] | u(1) |
|       if( ref_pic_list_sps_flag[ i ] ) { | |
|         if( num_ref_pic_lists_in_sps[ i ] > 1 && | |
|           ( i == 0 || ( i == 1 && rpl1_idx_present_flag ) ) ) | |
|         ref_pic_list_idx[ i ] | u(v) |
|         if( ltrp_modification_enable_flag ){ | |
|           ltrp_modificaion_flag[ i ] | u(1) |
|           if( ltrp_modification_flag[ i ] ){ | |
|             for( j = 0; j < NumLtrpEntries[ i ][ RplsIdx[ i ] ]; j++ ) { | |
|               poc_lsb_lt[ i ][ j ] | u(v) |
|             } | |
|           } | |
|         } | |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         delta_poc_msb_present_flag[ i ][ j ] | u(1) |
|         if( delta_poc_msb_present_flag[ i ][ j ] ) | |
|           delta_poc_msb_cycle_lt[ i ][ j ] | ue(v) |
|       } | |
|     } | |
|   } | |
|   rbsp_trailing_bits( ) | |
| } | |

IMAGE DECODING DEVICE, IMAGE DECODING METHOD, IMAGE ENCODING DEVICE, AND IMAGE ENCODING METHOD

CROSS-REFERENCE TO RELATED APPLICATIONS

The present application is based on PCT filing PCT/JP2020/010879, filed Mar. 12, 2020, which claims priority to U.S. Provisional Patent Application No. 62/817,197, filed Mar. 12, 2019, the entire contents of each are incorporated herein by reference.

TECHNICAL FIELD

The present disclosure relates to an image decoding device, an image decoding method, an image encoding device, and an image encoding method, and in particular, relates to an image decoding device, an image decoding method, an image encoding device, and an image encoding method that are enabled to further improve the practicality.

BACKGROUND ART

In H.264/AVC, which is one of the standard specifications of image coding schemes, each image (picture) is partitioned into one or more slices. Then, each of the slices is classified as one of an I-slice (intra slice), a P-slice (predictive slice), and a B-slice (bi-predictive slice). The I-slice is a slice that is independently decoded without referring to another image. The P-slice is a slice that is decoded by referring to another single image. The B-slice is a slice that is decoded by referring to a plurality of other images.

A picture that is made up of only the I-slice and placed at the beginning of a sequence is called an instantaneous decoding refresh (IDR) picture. The IDR picture is identified by the value of the network abstraction layer (NAL) unit type. A picture subsequent to the IDR picture in the same sequence is located only after the IDR picture in a presentation order without referring to a picture previous to the IDR picture in a decoding order. Accordingly, in a case where random access (not decoding from the beginning of a stream but decoding/reproducing from the middle of a stream) is attempted at a time point in the middle of a video of a certain coded stream, the video can be appropriately decoded from an IDR picture in the proximity to a designated time point.

In the standardization work for high efficiency video coding (HEVC), which is the next-generation image coding scheme following H.264/AVC, it has been proposed that a clean random access (CRA) picture is identified by the value of the NAL unit type separately from the IDR picture. The CRA picture is a picture that is made up of only the I-slice and placed in the middle of a sequence. A picture subsequent to the CRA picture in both of the decoding order and the presentation order does not refer to both of a picture preceding the CRA picture in the decoding order and a picture preceding the CRA picture in the presentation order. Accordingly, in a case where a random access to the CRA picture (decoding of a video from the CRA picture) is performed at a time point in the middle of the video, a decoding process for a picture subsequent to the CRA picture in the presentation order can be performed without failure.

Here, Non-Patent Document 1 discloses a guideline for saving reference image information in a header of a tile group in order to specify a reference image per each tile group image of a multi-tile image.

CITATION LIST

Non-Patent Document

Non-Patent Document 1: 14496-15: 2014, JVET-M1001

SUMMARY OF THE INVENTION

Problems to be Solved by the Invention

Incidentally, as disclosed in Non-Patent Document 1 mentioned above, in the past, the reference image information has to match in all the tile groups, and thus it has been redundant to designate the reference image per each tile group. Furthermore, in the past, in a case where the reference image as a long-term reference is desired to be updated, modifying only the long-term reference has not been allowed. For this reason, it has been expected to extend the past guidelines to further improve the practicality.

The present disclosure has been made in view of such a situation and is intended to enable further improvement of practicality.

Solutions to Problems

An image decoding device of a first aspect of the present disclosure includes a decoding unit that decodes an image of a bitstream made up of an access unit in which at least one or more network abstraction layer (NAL) units are arranged, in which reference image information indicating a reference image to be referred to by a current picture has been saved in a header region of the access unit.

An image decoding method of the first aspect of the present disclosure includes decoding, by an image decoding device that performs an image decoding process, an image of a bitstream made up of an access unit in which at least one or more NAL units are arranged, in which reference image information indicating a reference image to be referred to by a current picture has been saved in a header region of the access unit.

In the first aspect of the present disclosure, an image of a bitstream made up of an access unit in which at least one or more NAL units are arranged is decoded, and reference image information indicating a reference image to be referred to by a current picture has been saved in a header region of the access unit.

An image encoding device of a second aspect of the present disclosure includes an encoding unit that encodes an image of a bitstream made up of an access unit in which at least one or more NAL units are arranged, in which reference image information indicating a reference image to be referred to by a current picture is saved in a header region of the access unit.

An image encoding method of the second aspect of the present disclosure includes encoding, by an image encoding device that performs an image encoding process, an image of a bitstream made up of an access unit in which at least one or more NAL units are arranged, in which reference image information indicating a reference image to be referred to by a current picture is saved in a header region of the access unit.

In the second aspect of the present disclosure, encoding an image of a bitstream made up of an access unit in which at least one or more NAL units are arranged is included, and reference image information indicating a reference image to be referred to by a current picture is saved in a header region of the access unit.

BRIEF DESCRIPTION OF DRAWINGS

FIG. 1 is a diagram illustrating reference documents.

FIG. 4 is a diagram illustrating an exemplary configuration of a bitstream in a first variation of a first mode.

FIG. 5 is a diagram illustrating an exemplary description of the syntax of an access unit delimiter (AUD) NAL unit in the first variation of the first mode.

FIG. 12 is a diagram illustrating an exemplary configuration of a bitstream in a second variation of the first mode.

FIG. 13 is a diagram illustrating an exemplary description of the syntax of a NEW NAL unit in the second variation of the first mode.

FIG. 19 is a diagram illustrating an exemplary configuration of a bitstream in a first variation of a second mode.

FIG. 20 is a diagram illustrating an exemplary description of the syntax of sequence parameter set (SPS) NAL and AUD NAL in the first variation of the second mode.

FIG. 21 is a diagram illustrating an exemplary configuration of a bitstream in a second variation of the second mode.

FIG. 22 is a diagram illustrating an exemplary description of the syntax of SPS NAL and NEW NAL in the second variation of the second mode.

MODE FOR CARRYING OUT THE INVENTION

Figure 2:
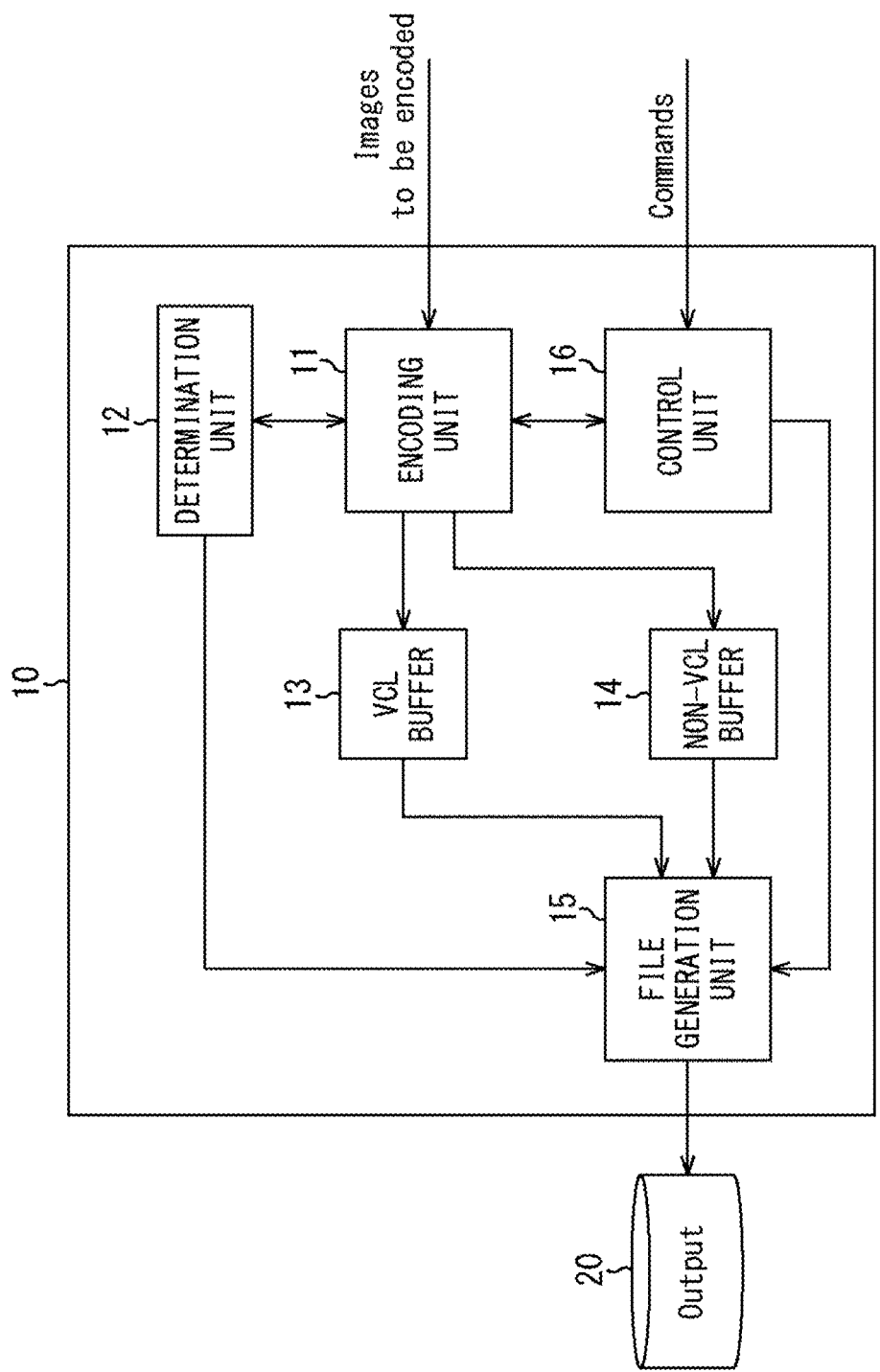
FIG. 2 is a block diagram illustrating an exemplary configuration of an image encoding device according to an embodiment to which the present technology is applied.

<Documents Etc. That Support Technological Contents and Terms>

The scope disclosed in the present description is not limited to the contents of the examples, and the contents of the reference documents REF 1 to REF 6 illustrated in FIG. 1, which are known at the time of filing, are also incorporated in the present description by reference.

In other words, the contents described in the reference documents REF 1 to REF 6 illustrated in FIG. 1 are also the basis for verifying the support requirements. For example, the NAL unit structure described in the reference document REF 4 and the byte stream format described in the reference document REF 5 are construed to be within the scope of the present disclosure and to meet the support requirements of the claims, even in a case where the above-mentioned technologies are not directly defined in the detailed description of the invention. Furthermore, similarly, for example, technological terms such as parsing, syntax, and semantics are also construed to be within the scope of the present disclosure and to meet the support requirements of the claims, even in a case where these technological terms are not directly defined in the detailed description of the invention.

Terminology

In the present application, the following terms are defined as follows.

<Block>

Unless otherwise noted, a "block" (not a block indicating a processing unit) used in the description as a partial region or a unit of processing of an image (picture) indicates any partial region in the picture, and its dimensions, shape, characteristics, and the like are not limited. For example, the "block" is assumed to include any partial region (a unit of processing) such as a transform block (TB), transform unit (TU), prediction block (PB), prediction unit (PU), smallest coding unit (SCU), coding unit (CU), largest coding unit (LCU), coding tree block (CTB), coding tree unit (CTU), conversion block, subblock, macroblock, tile, and slice.

<Designation of Block Size>

Furthermore, when the size of such a block is designated, not only the block size may be directly designated, but also the block size may be indirectly designated. For example, the block size may be designated using identification information that identifies the size. In addition, for example, the block size may be designated by the ratio or difference relative to the size of a block as a reference (for example, the LCU or SCU). For example, in a case where information that designates the block size is transmitted as a syntax element or the like, information that indirectly designates the size as described above may be used as that information. By designating the size in this manner, the amount of information of that information can be reduced, and the coding efficiency is enhanced in some cases. Besides, this designation of the block size also includes the designation of the range of the block size (for example, the designation of the range of an allowable block size).

<Unit of Information and Processing>

A unit of data for which various pieces of information are set and a unit of data targeted by various processes are both optional, and are not limited to the above-mentioned examples. For example, these pieces of information may be set per transform unit (TU), transform block (TB), prediction unit (PU), prediction block (PB), coding unit (CU), largest coding unit (LCU), subblock, block, tile, slice, picture, sequence, or component, whereas these processes may target data in those units of data. As a matter of course, these units of data can be set per information or process, and it is not necessary that the units of data are consistent among all pieces of information or processes. Note that a place where these pieces of information are saved is optional, and may be saved in the header, parameter set, or the like of the above-mentioned units of data. Furthermore, these pieces of information may be saved in a plurality of locations.

<Control Information>

Control information relating to the present technology may be transmitted from the encoding side to the decoding side. For example, control information (for example, enabled flag) that controls whether or not the application of the present technology described above is permitted (or prohibited) may be transmitted. Furthermore, for example, control information indicating a target to which the present technology described above is to be applied (or a target to which the present technology described above is not to be applied) may be transmitted. For example, control information that designates a block size (an upper limit, a lower limit, or both of the upper and lower limits), frame, component, layer, and the like to which the present technology is to be applied (or for which the application is permitted or prohibited) may be transmitted.

<Flag>

Note that, in the present description, the "flag" refers to information for identifying between a plurality of states, and includes not only information used when identifying between two states of true (1) and false (0), but also information capable of identifying between three or more states. Accordingly, the value that this "flag" can take may be, for example, a binary value of 1 or 0, or a ternary or more value. That is, the number of bits constituting this "flag" is optional, and one bit or a plurality of bits may be employed. Furthermore, identification information (including the flag) is supposed to have not only a form in which the identification information is included in the bitstream but also a form in which the difference information of the identification information with respect to certain reference information is included in the bitstream. Therefore, in the present description, the "flag" and "identification information" imply not only the whole information therein but also the difference information with respect to reference information.

<Association of Metadata>

In addition, various pieces of information (metadata and the like) regarding the coded data (bitstream) may be transmitted or recorded in any form as long as the information is associated with the coded data. Here, the term "associate" means, for example, to ensure that one piece of data is available (linkable) when another piece of data is processed. In other words, pieces of data associated with each other may be collected into one piece of data or each may be treated as individual pieces of data. For example, information associated with the coded data (image) may be transmitted on a transmission path different from the transmission path of the associated coded data (image). Furthermore, for example, information associated with the coded data (image) may be recorded on a recording medium (or a recording area of the same recording medium) different from the recording medium of the associated coded data (image). Note that this "association" may be made on a part of the data, instead of the entire data. For example, an image and information corresponding to this image may be associated with each other in any units such as a plurality of frames, one frame, or a part of the frame.

In addition, in the present description, terms such as "synthesize", "multiplex", "add", "integrate", "include", "save", "consolidate", "put into", and "insert" mean collecting a plurality of items into one, such as collecting coded data and metadata into one piece of data, and mean one method of "associate" described above. Furthermore, in the present description, encoding includes not only the entire process of converting an image into a bitstream but also a part of the process. For example, encoding not only includes a process that embraces a prediction process, orthogonal transformation, quantization, arithmetic coding, and the like, but also includes a process as which quantization and arithmetic coding are collectively referred to, a process that embraces a prediction process, quantization, and arithmetic coding, and the like. Similarly, decoding includes not only the entire process of converting a bitstream into an image, but also a part of the process. For example, decoding not only includes a process that embraces inverse arithmetic decoding, inverse quantization, inverse orthogonal transformation, a prediction process, and the like, but also includes a process that embraces inverse arithmetic decoding and inverse quantization, a process that embraces inverse arithmetic decoding, inverse quantization, and a prediction process, and the like.

Hereinafter, specific embodiments to which the present technology is applied will be described in detail with reference to the drawings.

<Image Encoding Device and Image Decoding Device>

An image encoding device and an image decoding device to which the present technology is applied will be described with reference to FIGS. 2 and 3.

As illustrated in FIG. 2, an image encoding device 10 has a configuration including an encoding unit 11, a determination unit 12, a video coding layer (VCL) buffer 13, a non-VCL buffer 14, a file generation unit 15, and a control unit 16.

The encoding unit 11 is an encoder that works in accordance with the HEVC scheme. The encoding unit 11 acquires an image sequence to be encoded from a moving image source such as a camera or a television tuner connected to the image encoding device 10. Then, the encoding unit 11 generates a coded bitstream by executing diverse processes such as intra prediction, inter-frame prediction, orthogonal transformation, quantization, and lossless coding on each image in the acquired image sequence. Slice data corresponding to the substance of the image is generated as a video coding layer (VCL) NAL unit.

Meanwhile, parameter sets such as a sequence parameter set (SPS), a picture parameter set (PPS), and an adaptation parameter set (APS) can be generated as non-VCL NAL units. The encoding unit 11 outputs a bitstream of the VCL NAL unit, that is, the slice data, to the file generation unit 15 via the VCL buffer 13. Furthermore, the encoding unit 11 outputs the parameter sets to the file generation unit 15 via the non-VCL buffer 14.

The determination unit 12 determines the type of each image in the image sequence to be encoded by the encoding unit 11. More specifically, in the present embodiment, the determination unit 12 at least determines whether each image is an IDR picture, a CRA picture, or a picture other than these pictures. Both of the IDR picture and the CRA picture are pictures made up of only the I-slice.

As mentioned earlier, the IDR picture is a picture at the beginning of the sequence. A picture subsequent to the IDR picture in the same sequence does not refer to a picture previous to the IDR picture in a coding order (decoding order) and is located only after the IDR picture in a presentation order. The CRA picture is a picture that is located in the middle of the sequence and can be used as a decoding start picture at the time of random access on the decoder side. A picture subsequent to the CRA picture in both of the coding order (decoding order) and the presentation order does not refer to both of a picture preceding the CRA picture in the coding order (decoding order) and a picture preceding the CRA picture in the presentation order. The determination unit 12 outputs the result of the determination to the encoding unit 11 and the file generation unit 15. The encoding unit 11 allocates a NAL unit type indicating the type of each image determined by the determination unit 12 to a NAL header of each NAL unit.

Incidentally, in a case where a random access to the CRA picture is performed, only the CRA picture as the random access destination and a picture subsequent to this CRA picture in the decoding order are targeted for decoding. However, there can be a picture subsequent to the CRA picture in the decoding order but preceding the CRA picture in the presentation order. In the present description, such a picture is referred to as a preceding picture. As can be seen from the definition of the CRA picture, it is allowable for the preceding picture to refer to a picture preceding the CRA picture in the decoding order.

When a random access to the CRA picture is performed, the preceding picture that refers to a picture preceding the CRA picture in the decoding order is not decoded normally. This is because the picture referred to by the preceding picture has not been decoded. That is, in a case where a random access is performed, whether or not the preceding picture targeted for decoding can be normally decoded depends on the reference relationship of the preceding picture. Thus, the determination unit 12 may further determine the preceding picture that is not to be normally decoded in a case where a random access to each CRA picture is performed, and provide the result of the determination to the file generation unit 15.

The VCL buffer 13 buffers the VCL NAL unit. The slice data of the CRA picture is buffered by the VCL buffer 13.

The non-VCL buffer 14 buffers the non-VCL NAL unit.

The file generation unit 15 generates a moving image file in which a series of coded pieces of image data is saved, in accordance with a file format including a header region and a data region, and outputs the generated moving image file to a storage unit 20. In this description, an example in which the MP4 format is used as the file format will be mainly described. However, the technology according to the present disclosure is not limited to such an example, and is applicable to other kinds of moving image file formats having the header region and the data region.

In the MP4 format, data is saved in an object called a box, and recorded in units of objects. The boxes form a tree structure within one file, and a parent box contains a child box. The kind of each box is identified by a four-alphabetical letter identifier.

More specifically, the file generation unit 15 inserts a bitstream of the slice data corresponding to the VCL NAL unit into the data region (for example, an mdat box) of the moving image file in the decoding order. Furthermore, the file generation unit 15 inserts one or more parameter sets corresponding to the non-VCL NAL units into the header region (for example, a moov box) of the moving image file.

Moreover, in the present embodiment, the file generation unit 15 inserts CRA information that identifies one or more CRA pictures determined by the determination unit 12 into the header region of the moving image file. Additionally, the file generation unit 15 may append, to the CRA information, preceding picture information for identifying a preceding picture that is not to be normally decoded in a case where a random access to each CRA picture is performed.

The control unit 16 controls an encoding process executed in the image encoding device 10. For example, when an instruction to start encoding is detected, the control unit 16 causes the encoding unit 11 to encode a designated image sequence. Furthermore, the control unit 16 causes the file generation unit 15 to generate a moving image file in which image data encoded by the encoding unit 11 is saved. The control unit 16 may use a hypothetical decoder model called a hypothetical reference decoder (HRD) to control the generation of a coded stream so as not to bring about a failure in the decoder buffer.

Figure 3:
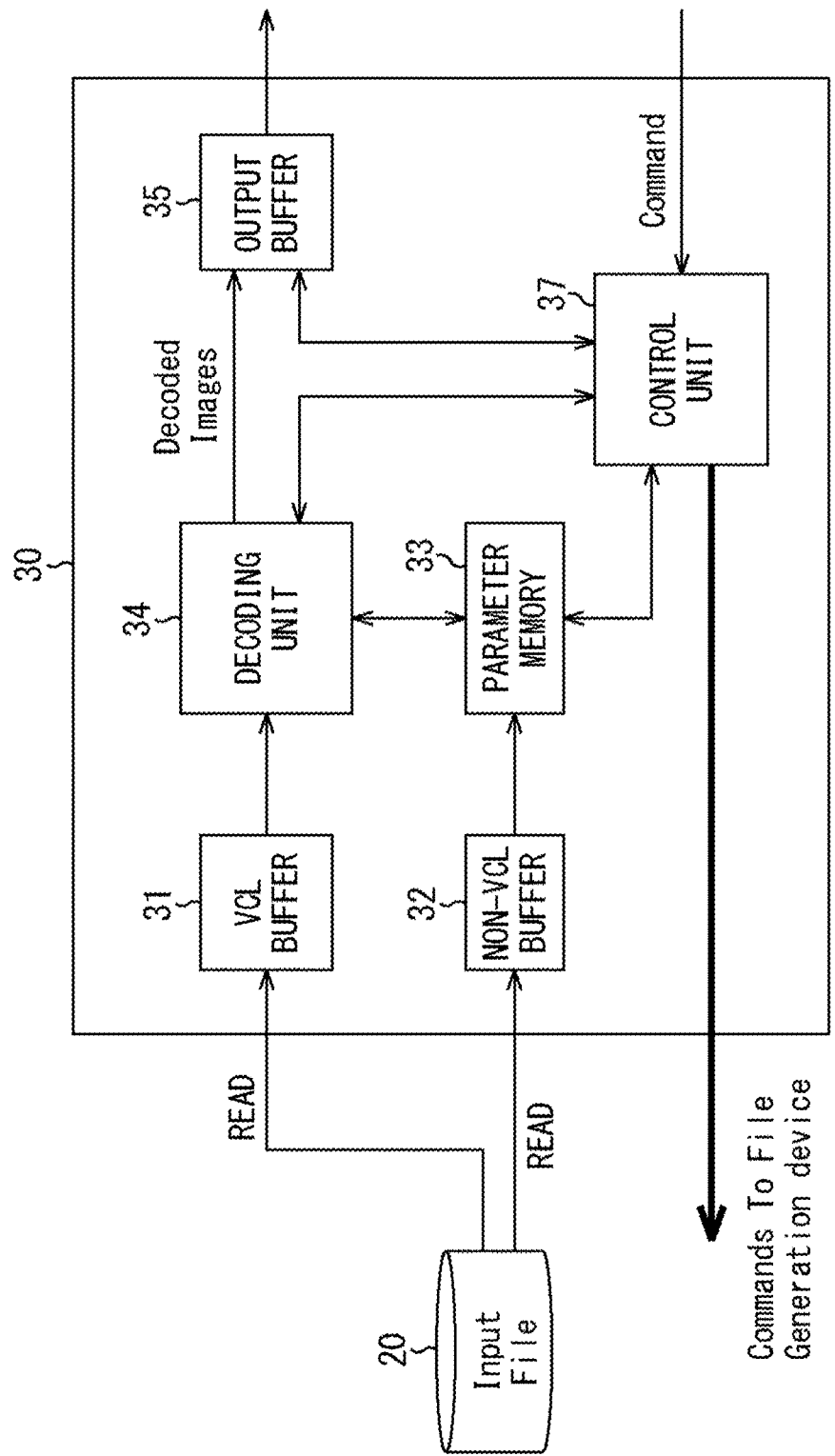
FIG. 3 is a block diagram illustrating an exemplary configuration of an image decoding device according to an embodiment to which the present technology is applied.

As illustrated in FIG. 3, the image decoding device 30 has a configuration including a VCL buffer 31, a non-VCL buffer 32, a parameter memory 33, a decoding unit 34, an output buffer 35, and a control unit 37.

The VCL buffer 31 buffers a bitstream of image data (typically, the slice data) read from the data region (for example, the mdat box) of a moving image file stored in the storage unit 20.

The non-VCL buffer 32 buffers parameter sets such as SPS, PPS, and APS read from the header region (for example, the moov box) of the moving image file stored in the storage unit 20, and header information such as the CRA information.

The parameter memory 33 stores the information in the header region of the file acquired via the non-VCL buffer 32 as a whole. The CRA information that can be recorded in the header region of the moving image file in diverse formats described above is held by the parameter memory 33 while the moving image file is being opened.

The decoding unit 34 is a decoder that works in accordance with the HEVC scheme. The decoding unit 34 decodes the image sequence from the bitstream acquired from the data region of the moving image file via the VCL buffer 31. The decoding unit 34 uses parameters in the parameter sets stored in the parameter memory 33 when decoding the image. The decoding unit 34 sorts the images in the decoded image sequence in the presentation order, and outputs the sorted images to the output buffer 35.

Usually, the decoding unit 34 accesses the slice data saved in a moving image track in the moving image file in the decoding order, in order from the beginning of the slice data. However, when the control unit 37 detects a random access instruction, the decoding unit 34 performs a random access to the decoding start picture (in the middle of the moving image track) specified by the control unit 37, and decodes the image sequence from the accessed decoding start picture. The decoding start picture is one of the IDR picture and the CRA picture in the moving image track.

The output buffer 35 is a decoded picture buffer (DPB) for buffering an image decoded by the decoding unit 34. The image buffered by the output buffer 35 is output to a display or processor (not illustrated) at an output timing of this buffered image.

The control unit 37 controls an image decoding process executed in the image decoding device 30. For example, the control unit 37 opens a moving image file stored in the storage unit 20 in response to an instruction from a user, and causes the decoding unit 34 to start decoding an image sequence. Furthermore, in a case where a random access instruction is detected, the control unit 37 uses the CRA information to specify one CRA picture in the image sequence as the decoding start picture. Then, the control unit 37 causes the decoding unit 34 to decode the image sequence from the specified decoding start picture (that is, from the middle of the moving image track).

Typically, the control unit 37 specifies a CRA picture located most proximal to a timing designated in the random access instruction (for example, a timing pointed to by a pointer operated on a seek bar of a moving image reproduction window) as the decoding start picture.

In a case where the CRA information contains the preceding picture information described above, the control unit 37 may cause the preceding picture identified using the preceding picture information, which is not to be normally decoded, to be skipped from the output from the output buffer 35 (and the decoding by the decoding unit 34). By using the preceding picture information, a damaged image can be prevented from being presented on a display or being output to an external processor. At that time, the control unit 37 does not have to determine ex post facto whether or not each image has been normally decoded.

Furthermore, the control unit 37 can send a command to the control unit 16 of the image encoding device 10.

<First Mode of Bitstream>

A first variation of a first mode of the bitstream will be described with reference to FIGS. 4 to 11.

As illustrated in FIG. 4, the bitstream is constituted by a plurality of access units (AUs), and at least one or more NAL units are arranged in each access unit corresponding to one frame. Furthermore, there is a plurality of kinds of NAL units, and, for example, the kinds include an access unit delimiter (AUD) NAL unit, a sequence parameter set (SPS) NAL unit, a picture parameter set (PPS) NAL unit, a tile group NAL unit, and the like.

The AUD NAL unit indicates a delimiter between access units, and in general, only one AUD NAL unit is always arranged at the beginning of each access unit. Note that the current AUD is already given syntax that indicates the attributes of all tile group NALs in the access unit.

In the SPS NAL unit, a sequence parameter necessary for reproducing the bitstream is saved. In the PPS NAL unit, a sequence parameter necessary for reproducing the picture is saved. In the tile group NAL unit, images per tile group are saved.

Then, three cases as illustrated in the figure are supposed as the configuration of the bitstream.

For example, in the first case, for all access units, the AUD NAL unit is arranged first, the SPS NAL unit is arranged second, the PPS NAL unit is arranged third, and thereafter, the tile group NAL units are arranged consecutively. That is, in the first case, the SPS NAL unit and the PPS NAL unit are allocated to every access unit.

Furthermore, in the second case, for the access unit at the beginning, the AUD NAL unit is arranged first, the SPS NAL unit is arranged second, the PPS NAL unit is arranged third, and thereafter, the tile group NAL units are arranged consecutively. Then, for the second and following access units, the AUD NAL unit is arranged first, the PPS NAL unit is arranged second, and thereafter, the tile group NAL units are arranged consecutively. That is, in the second case, the SPS NAL unit is allocated to the access unit at the beginning, and the PPS NAL unit is allocated to every access unit.

In addition, in the third case, for the access unit at the beginning, the AUD NAL unit is arranged first, the SPS NAL unit is arranged second, the PPS NAL unit is arranged third, and thereafter, the tile group NAL units are arranged consecutively. Then, for the second and following access units, the AUD NAL unit is arranged first, and thereafter, the tile group NAL units are arranged consecutively. That is, in the third case, the SPS NAL unit and the PPS NAL unit are allocated only to the access unit at the beginning.

Then, in the first variation of the first mode of the bitstream, in any of the first to third cases, the configuration has been modified from the past configuration in that reference image information indicating a reference image to be referred to by a current picture is arranged in the AUD NAL unit. For example, this reference image information allows to designate ref_pic_list_idx placed in tile group header or to set a new ref_pic_list_struct. In this manner, by arranging the reference image information in the AUD NAL unit placed in the header region of the access unit and applying the arranged reference image information to all the tile group NAL units in the access unit, redundancy can be prevented as compared with when the reference image is designated per tile group.

Specifically, in the first variation of the first mode of the bitstream, the syntax of AUD NAL is described as illustrated in FIG. 5. As illustrated in FIG. 5, in the syntax of AUD NAL, the syntax of pic type is extended such that ref_pic_list_idx can be designated and a new ref_pic_list_struct can be set.

An example of a NAL generation process in an image encoding process executed by the image encoding device 10 will be described with reference to the flowchart illustrated in FIG. 6.

For example, when an image sequence is supplied to the image encoding device 10, the NAL generation process is started, and in step S11, the encoding unit 11 determines whether or not there is a NAL unit to be generated from the image sequence.

In a case where the encoding unit 11 determines in step S11 that there is a NAL unit to be generated from the image sequence, the process proceeds to step S12.

In step S12, the encoding unit 11 determines whether or not the NAL unit to be generated from the image sequence is the AUD NAL unit.

In a case where the encoding unit 11 determines in step S12 that the NAL unit to be generated from the image sequence is the AUD NAL unit, the process proceeds to step S13. Then, in step S13, the encoding unit 11 performs an AUD encoding process to generate an AUD NAL unit containing the reference image information, and supplies the generated AUD NAL unit to the file generation unit 15 via the non-VCL buffer 14. Subsequently, the process returns to step S11, and a similar process is repeatedly performed thereafter. On the other hand, in a case where the encoding unit 11 determines in step S12 that the NAL unit to be generated from the image sequence is not the AUD NAL unit, the process proceeds to step S14.

In step S14, the encoding unit 11 determines whether or not the NAL unit to be generated from the image sequence is the SPS NAL unit.

In a case where the encoding unit 11 determines in step S14 that the NAL unit to be generated from the image sequence is the SPS NAL unit, the process proceeds to step S15. Then, in step S15, the encoding unit 11 performs an SPS encoding process to generate an SPS NAL unit, and supplies the generated SPS NAL unit to the file generation unit 15 via the non-VCL buffer 14. Subsequently, the process returns to step S11, and a similar process is repeatedly performed thereafter. On the other hand, in a case where the encoding unit 11 determines in step S14 that the NAL unit to be generated from the image sequence is not the SPS NAL unit, the process proceeds to step S16.

In step S16, the encoding unit 11 determines whether or not the NAL unit to be generated from the image sequence is the PPS NAL unit.

In a case where the encoding unit 11 determines in step S16 that the NAL unit to be generated from the image sequence is the PPS NAL unit, the process proceeds to step S17. Then, in step S17, the encoding unit 11 performs a PPS encoding process to generate a PPS NAL unit, and supplies the generated PPS NAL unit to the file generation unit 15 via the non-VCL buffer 14. Subsequently, the process returns to step S11, and a similar process is repeatedly performed thereafter. On the other hand, in a case where the encoding unit 11 determines in step S16 that the NAL unit to be generated from the image sequence is not the PPS NAL unit, the process proceeds to step S18.

In step S18, the encoding unit 11 determines whether or not the NAL unit to be generated from the image sequence is the tile group NAL unit.

In a case where the encoding unit 11 determines in step S18 that the NAL unit to be generated from the image sequence is the tile group NAL unit, the process proceeds to step S19. Then, in step S19, the encoding unit 11 performs a tile group encoding process to generate a tile group NAL unit, and supplies the generated tile group NAL unit to the file generation unit 15 via the VCL buffer 13. Subsequently, the process returns to step S11, and a similar process is repeatedly performed thereafter. On the other hand, in a case where the encoding unit 11 determines in step S18 that the NAL unit to be generated from the image sequence is not the tile group NAL unit, the process proceeds to step S20.

In step S20, the encoding unit 11 performs an encoding process of encoding another NAL unit apart from any of the above-described NAL units. Subsequently, the process returns to step S11, and a similar process is repeatedly performed thereafter.

On the other hand, in a case where the encoding unit 11 determines in step S11 that there is no NAL unit to be generated from the image sequence, the NAL generation process is ended.

Figure 6:
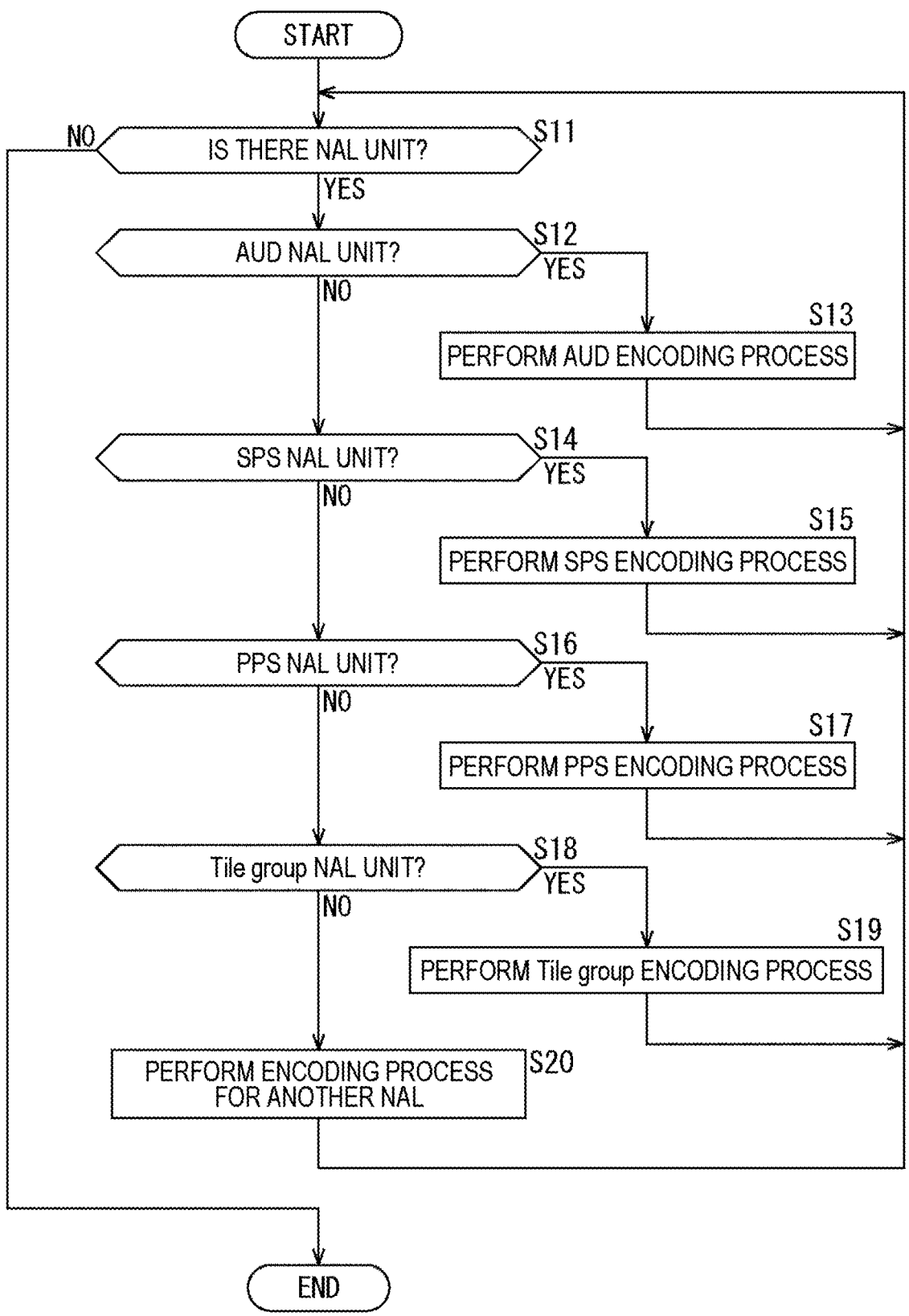
FIG. 6 is a flowchart explaining a NAL generation process of an image encoding process.
Figure 7:
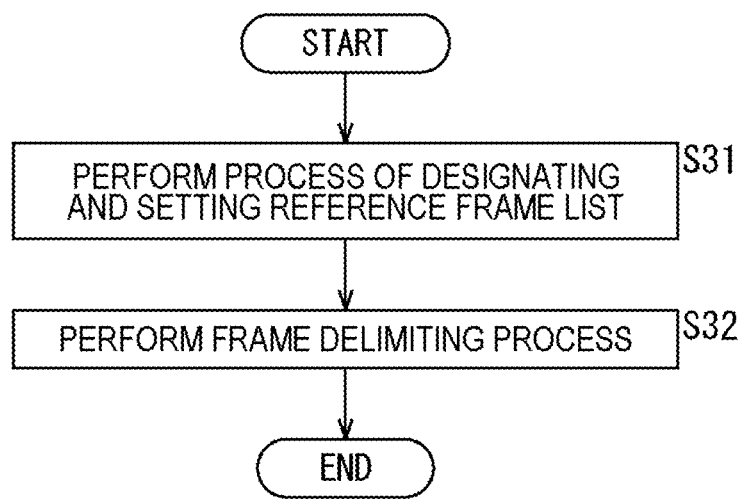
FIG. 7 is a flowchart explaining an AUD encoding process.

FIG. 7 is a flowchart explaining the AUD encoding process performed in step S13 of FIG. 6.

In step S31, the encoding unit 11 performs a process of designating and setting a reference frame list in line with the reference image information, and is allowed to, for example, designate ref_pic_list_idx placed in tile group header or set a new ref_pic_list_struct.

In step S32, the encoding unit 11 generates the AUD NAL unit by performing a frame delimiting process of delimiting the frame (access unit), and subsequently, the AUD encoding process is ended.

Figure 8:
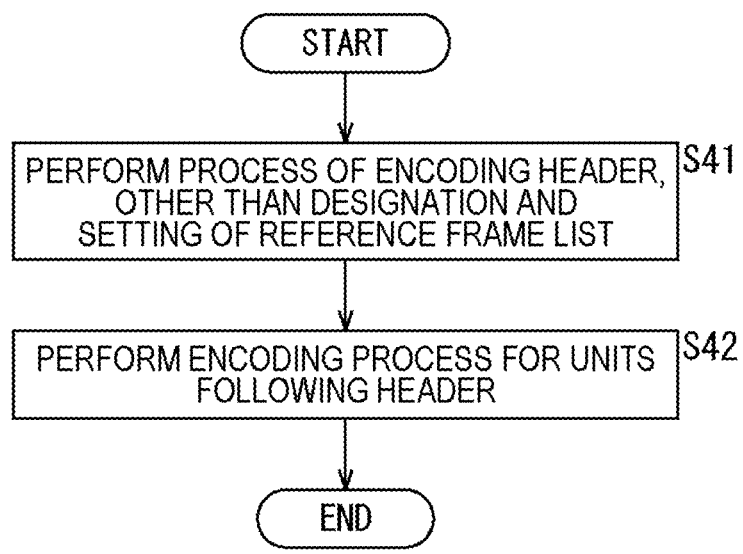
FIG. 8 is a flowchart explaining a tile group encoding process.

FIG. 8 is a flowchart explaining the tile group encoding process performed in step S19 of FIG. 6.

In step S41, the encoding unit 11 performs a process of encoding the header, other than the process of designating and setting the reference frame list.

In step S42, the encoding unit 11 performs an encoding process of encoding the units following the header, and subsequently, the tile group encoding process is ended.

By the NAL generation process as described above, the image encoding device 10 can generate the AUD NAL unit in which the reference image information is arranged, and generate a moving image file made up of the bitstream as described above with reference to FIG. 4, that is, encode an image of a bitstream made up of an access unit in which at least one or more NAL units are arranged.

An example of a NAL generation process in the image decoding process executed by the image decoding device 30 will be described with reference to the flowchart illustrated in FIG. 9.

For example, when the image decoding device 30 reads out a bitstream stored in the storage unit 20, the process is started, and in step S51, the decoding unit 34 determines whether or not there is a NAL unit to be decoded from the bitstream.

In a case where the decoding unit 34 determines in step S51 that there is a NAL unit to be decoded from the bitstream, the process proceeds to step S52.

In step S52, the decoding unit 34 determines whether or not the NAL unit to be decoded from the bitstream is the AUD NAL unit.

In a case where the decoding unit 34 determines in step S52 that the NAL unit to be decoded from the bitstream is the AUD NAL unit, the process proceeds to step S53. Then, in step S53, the decoding unit 34 supplies the reference image information acquired by performing an AUD decoding process to decode the AUD NAL unit to the parameter memory 33. Subsequently, the process returns to step S51, and a similar process is repeatedly performed thereafter. On the other hand, in a case where the decoding unit 34 determines in step S52 that the NAL unit to be decoded from the bitstream is not the AUD NAL unit, the process proceeds to step S54.

In step S54, the decoding unit 34 determines whether or not the NAL unit to be decoded from the bitstream is the SPS NAL unit.

In a case where the decoding unit 34 determines in step S54 that the NAL unit to be decoded from the bitstream is the SPS NAL unit, the process proceeds to step S55. Then, in step S55, the decoding unit 34 supplies a parameter acquired by performing an SPS decoding process to decode the SPS NAL unit to the parameter memory 33. Subsequently, the process returns to step S51, and a similar process is repeatedly performed thereafter. On the other hand, in a case where the decoding unit 34 determines in step S54 that the NAL unit to be decoded from the bitstream is not the SPS NAL unit, the process proceeds to step S56.

In step S56, the decoding unit 34 determines whether or not the NAL unit to be decoded from the bitstream is the PPS NAL unit.

In a case where the decoding unit 34 determines in step S56 that the NAL unit to be decoded from the bitstream is the PPS NAL unit, the process proceeds to step S57. Then, in step S57, the decoding unit 34 supplies a parameter acquired by performing a PPS decoding process to decode the PPS NAL unit to the parameter memory 33. Subsequently, the process returns to step S51, and a similar process is repeatedly performed thereafter. On the other hand, in a case where the decoding unit 34 determines in step S56 that the NAL unit to be decoded from the bitstream is not the PPS NAL unit, the process proceeds to step S58.

In step S58, the decoding unit 34 determines whether or not the NAL unit to be decoded from the bitstream is the tile group NAL unit.

In a case where the decoding unit 34 determines in step S58 that the NAL unit to be decoded from the bitstream is the tile group NAL unit, the process proceeds to step S59. Then, in step S59, the decoding unit 34 supplies an image obtained by performing a tile group decoding process to decode the tile group NAL unit to the output buffer 35. Subsequently, the process returns to step S51, and a similar process is repeatedly performed thereafter. On the other hand, in a case where the decoding unit 34 determines in step S58 that the NAL unit to be decoded from the bitstream is not the tile group NAL unit, the process proceeds to step S60.

In step S60, the decoding unit 34 performs a decoding process of decoding another NAL unit apart from any of the above-described NAL units. Subsequently, the process returns to step S51, and a similar process is repeatedly performed thereafter.

On the other hand, in a case where the decoding unit 34 determines in step S51 that there is no NAL unit to be decoded from the bitstream, the NAL generation process is ended.

Figure 9:
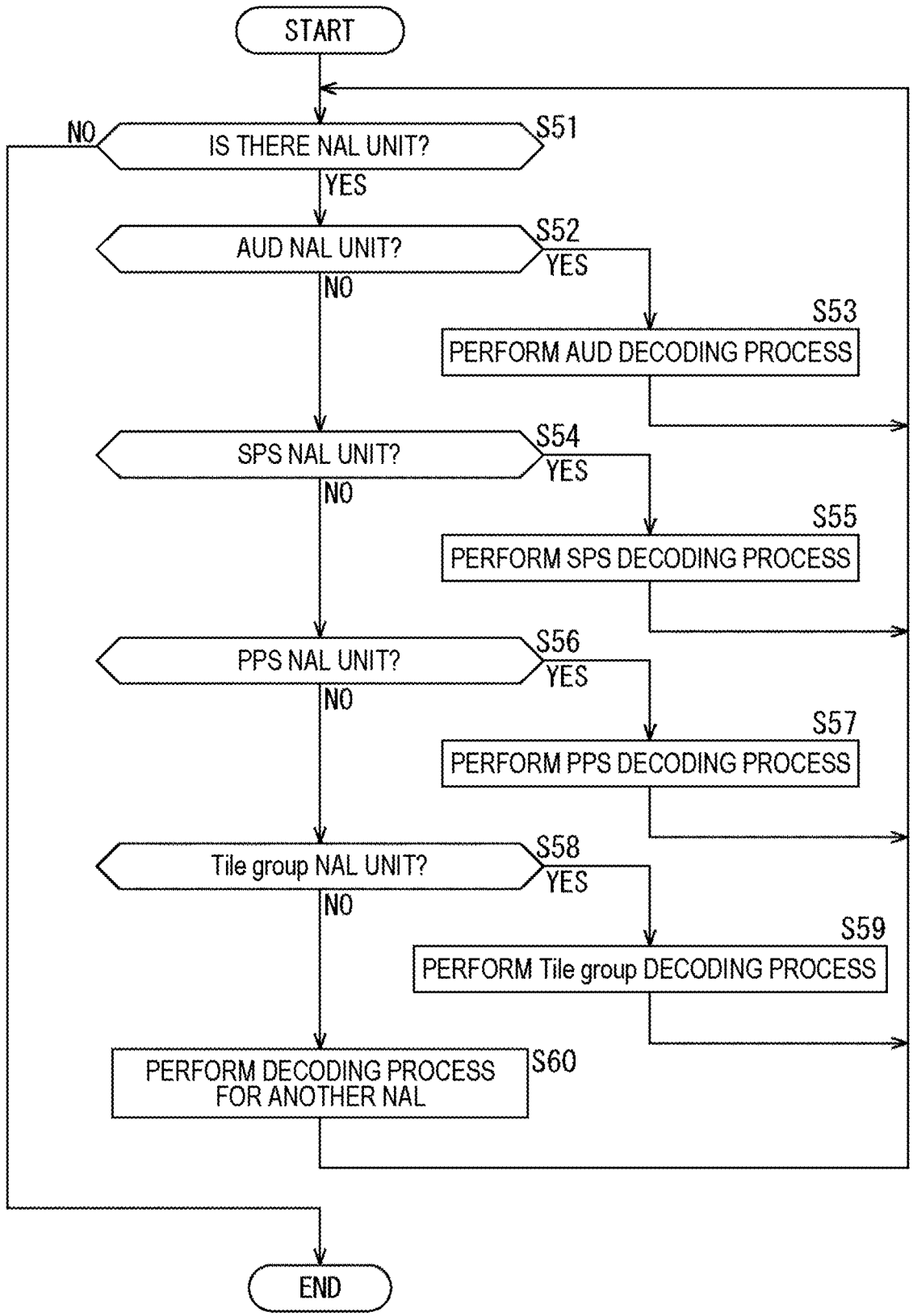
FIG. 9 is a flowchart explaining a NAL generation process in an image decoding process.
Figure 10:
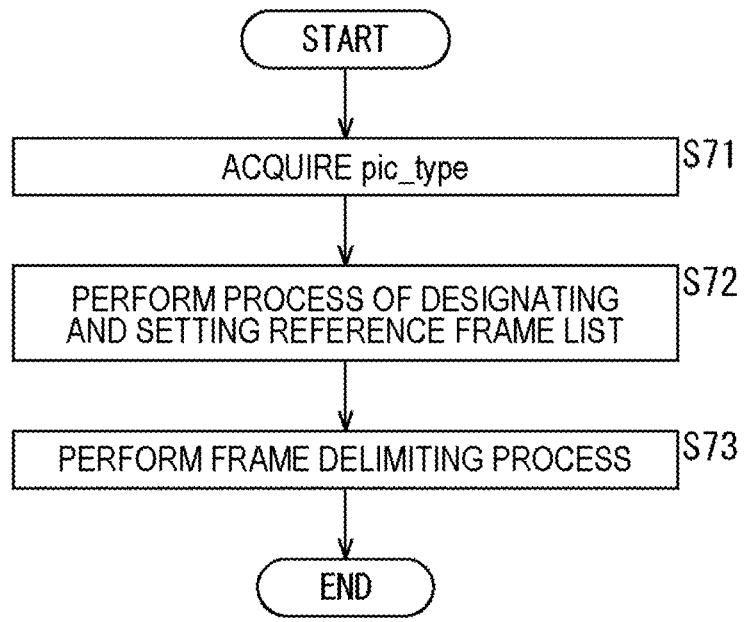
FIG. 10 is a flowchart explaining an AUD decoding process.

FIG. 10 is a flowchart explaining the AUD decoding process performed in step S53 of FIG. 9.

In step S71, the decoding unit 34 acquires the picture type from the AUD NAL unit.

In step S72, the decoding unit 34 acquires the reference image information from the AUD NAL unit, and performs a process of designating and setting the reference frame list in accordance with the reference image information.

In step S73, the decoding unit 34 decodes the AUD NAL unit by performing a frame delimiting process of delimiting the frame (access unit), and subsequently, the AUD decoding process is ended.

Figure 11:
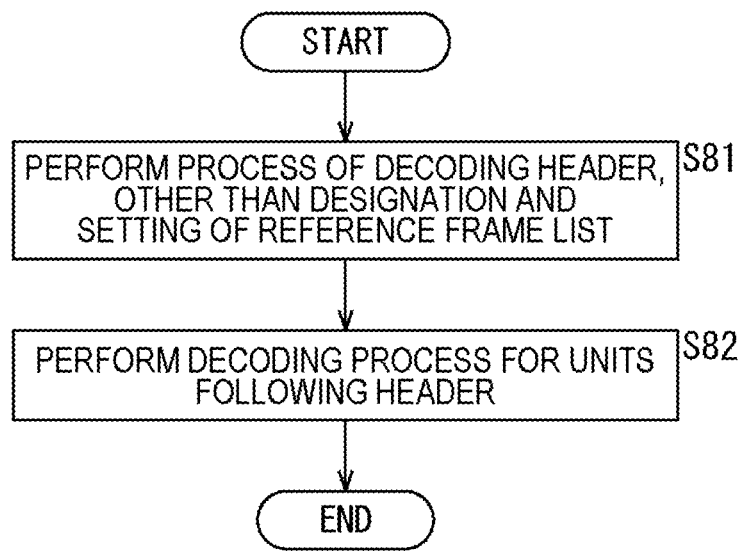
FIG. 11 is a flowchart explaining a tile group decoding process.

FIG. 11 is a flowchart explaining the tile group decoding process performed in step S59 of FIG. 9.

In step S81, the decoding unit 34 performs a process of decoding the header, other than the process of designating and setting the reference frame list.

In step S82, the decoding unit 34 performs a decoding process of decoding the units following the header, and subsequently, the tile group decoding process is ended.

As described above, the image decoding device 30 can decode the image in accordance with the reference image information acquired from the AUD NAL unit, that is, decode an image of the bitstream made up of an access unit in which at least one or more NAL units are arranged.

A second variation of the first mode of the bitstream will be described with reference to FIGS. 12 to 17.

As illustrated in FIG. 12, the bitstream is constituted by a plurality of access units similarly to the case described above with reference to FIG. 4, and at least one or more NAL units are arranged in each access unit. Furthermore, similarly to the first variation of the first mode of the bitstream (see FIG. 4), three cases as illustrated in FIG. 12 are supposed as the configuration of the bitstream.

Then, in the second variation of the first mode of the bitstream, a NEW NAL unit is used as the NAL unit in addition to the AUD NAL unit, the SPS NAL unit, the PPS NAL unit, and the tile group NAL unit.

For example, in the first case, for all access units, the AUD NAL unit is arranged first, the SPS NAL unit is arranged second, the PPS NAL unit is arranged third, the NEW NAL unit is arranged fourth, and thereafter, the tile group NAL units are arranged consecutively. That is, in the first case, the SPS NAL unit and the PPS NAL unit are allocated to every access unit, and the NEW NAL unit is further allocated.

Furthermore, in the second case, for the access unit at the beginning, the AUD NAL unit is arranged first, the SPS NAL unit is arranged second, the PPS NAL unit is arranged third, the NEW NAL unit is arranged fourth, and thereafter, the tile group NAL units are arranged consecutively. Then, for the second and following access units, the AUD NAL unit is arranged first, the PPS NAL unit is arranged second, the NEW NAL unit is arranged third, and thereafter, the tile group NAL units are arranged consecutively. That is, in the second case, the SPS NAL unit is allocated to the access unit at the beginning, the PPS NAL unit is allocated to every access unit, and the NEW NAL unit is further allocated.

In addition, in the third case, for the access unit at the beginning, the AUD NAL unit is arranged first, the SPS NAL unit is arranged second, the PPS NAL unit is arranged third, the NEW NAL unit is arranged fourth, and thereafter, the tile group NAL units are arranged consecutively. Then, for the second and following access units, the AUD NAL unit is arranged first, the NEW NAL unit is arranged second, and thereafter, the tile group NAL units are arranged consecutively. That is, in the third case, the SPS NAL unit and the PPS NAL unit are allocated only to the access unit at the beginning, and the NEW NAL unit is allocated to every access unit.

Then, in the second variation of the first mode of the bitstream, in any of the first to third cases, the configuration has been modified from the past configuration in that the reference image information indicating the reference image to be referred to by the current picture is arranged in the NEW NAL unit. For example, this reference image information allows to designate ref_pic_list_idx placed in tile group header or to set a new ref_pic_list_struct. In this manner, by arranging the reference image information in the NEW NAL unit (a NAL unit for identification) placed in the header region of the access unit and applying the arranged reference image information to all the tile group NAL units in the access unit, redundancy can be prevented as compared with when the reference image is designated per tile group.

Specifically, in the second variation of the first mode of the bitstream, the syntax of the NEW NAL unit is described as illustrated in FIG. 13. As illustrated in FIG. 13, in the syntax of NEW NAL, ref_pic_list_idx can be designated and a new ref_pic_list_struct can be set.

An example of a NAL generation process performed in the image encoding process executed by the image encoding device 10 will be described with reference to the flowchart illustrated in FIG. 14.

In steps S101 to S107, processes similar to the processes in steps S11 to S17 described above with reference to the flowchart in FIG. 6 are performed. Then, in step S108, the encoding unit 11 determines whether or not the NAL unit to be generated from the image sequence is the NEW NAL unit.

In a case where the encoding unit 11 determines in step S108 that the NAL unit to be generated from the image sequence is the NEW NAL unit, the process proceeds to step S109. Then, in step S109, the encoding unit 11 performs a NEW encoding process to generate a NEW NAL unit containing the reference image information, and supplies the generated NEW NAL unit to the file generation unit 15 via the non-VCL buffer 14. Subsequently, the process returns to step S101, and a similar process is repeatedly performed thereafter. On the other hand, in a case where the encoding unit 11 determines in step S108 that the NAL unit to be generated from the image sequence is not the NEW NAL unit, the process proceeds to step S110.

Then, in steps S110 to 112, processes similar to the processes in steps S18 to S20 described above with reference to the flowchart in FIG. 6 are performed, and subsequently, the NAL generation process is ended.

Figure 14:
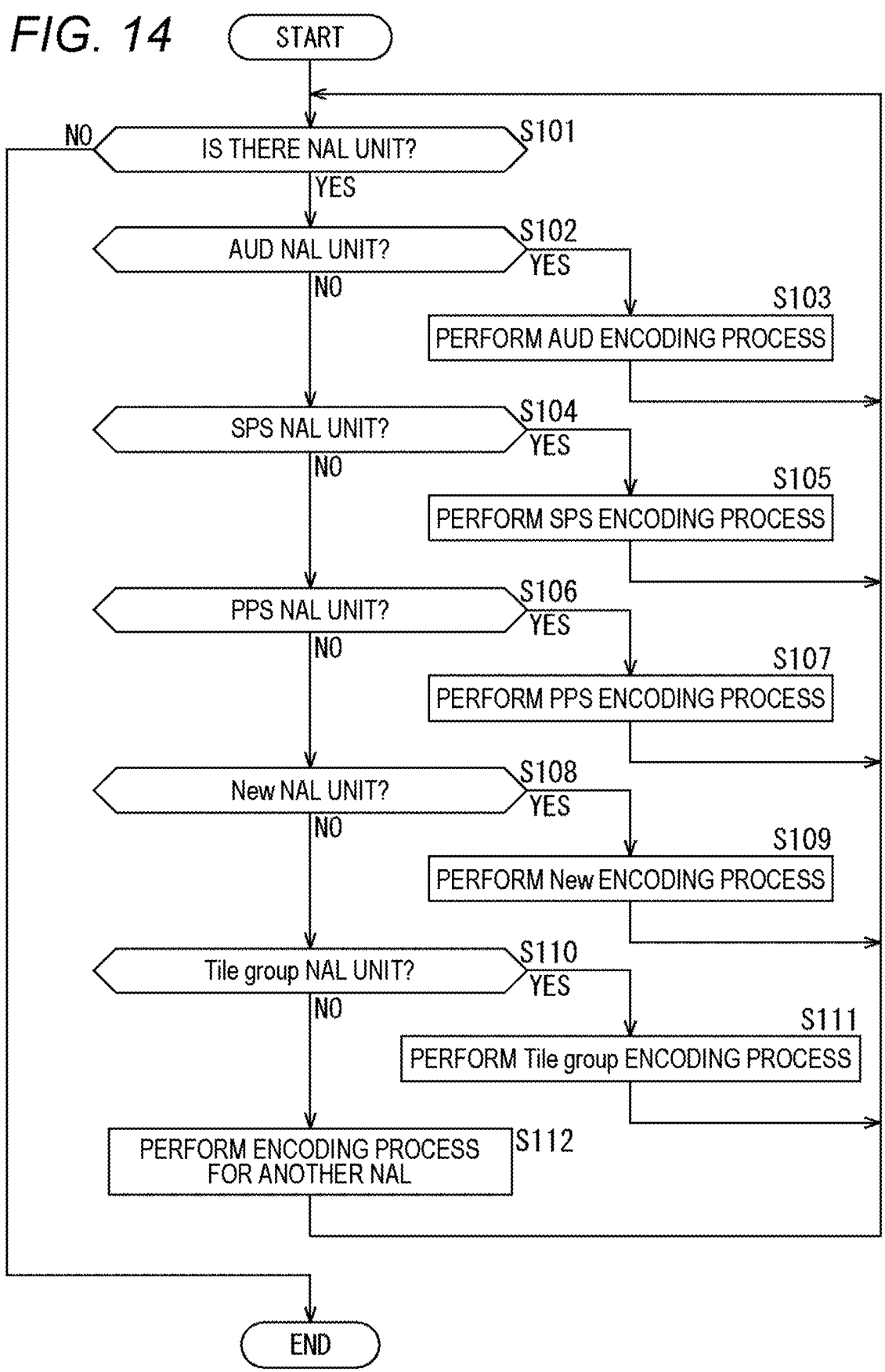
FIG. 14 is a flowchart explaining a NAL generation process in an image encoding process.
Figure 15:
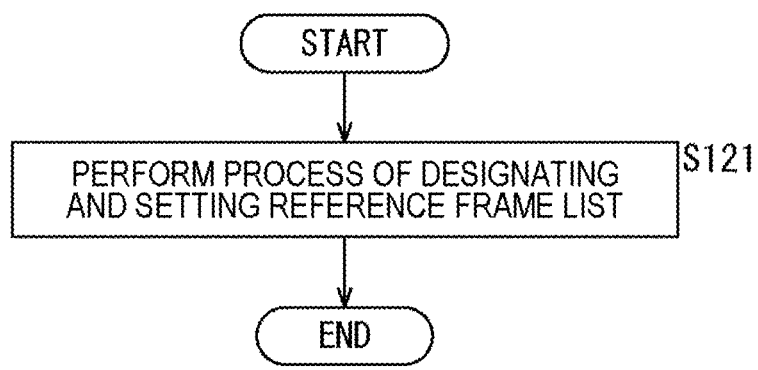
FIG. 15 is a flowchart explaining a NEW encoding process.

FIG. 15 is a flowchart explaining the NEW encoding process performed in step S109 of FIG. 14.

In step S121, the encoding unit 11 performs a process of designating and setting the reference frame list in line with the reference image information and, for example, designates ref_pic_list_idx placed in tile group header or sets a new ref_pic_list_struct. In this manner, the encoding unit 11 generates the NEW NAL unit, and subsequently, the NEW encoding process is ended.

Note that a tile group encoding process performed in step S111 of FIG. 14 is performed similarly to the tile group encoding process described above with reference to the flowchart in FIG. 8.

By the NAL generation process as described above, the image encoding device 10 can generate the NEW NAL unit in which the reference image information is arranged, and generate a moving image file made up of the bitstream as described above with reference to FIG. 12, that is, encode an image of a bitstream made up of an access unit in which at least one or more NAL units are arranged.

An example of a NAL generation process in the image decoding process executed by the image decoding device 30 will be described with reference to the flowchart illustrated in FIG. 16.

In steps S131 to S137, processes similar to the processes in steps S51 to S57 described above with reference to the flowchart in FIG. 9 are performed. Then, in step S138, the decoding unit 34 determines whether or not the NAL unit to be decoded from the bitstream is the NEW NAL unit.

In a case where the decoding unit 34 determines in step S138 that the NAL unit to be decoded from the bitstream is the NEW NAL unit, the process proceeds to step S139. Then, in step S139, the decoding unit 34 supplies the reference image information acquired by performing a NEW decoding process to decode the NEW NAL unit to the parameter memory 33. Subsequently, the process returns to step S131, and a similar process is repeatedly performed thereafter. On the other hand, in a case where the decoding unit 34 determines in step S138 that the NAL unit to be decoded from the bitstream is not the AUD NAL unit, the process proceeds to step S140.

Then, in steps S140 to 142, processes similar to the processes in steps S58 to S60 described above with reference to the flowchart in FIG. 9 are performed, and subsequently, the NAL generation process is ended.

Figure 16:
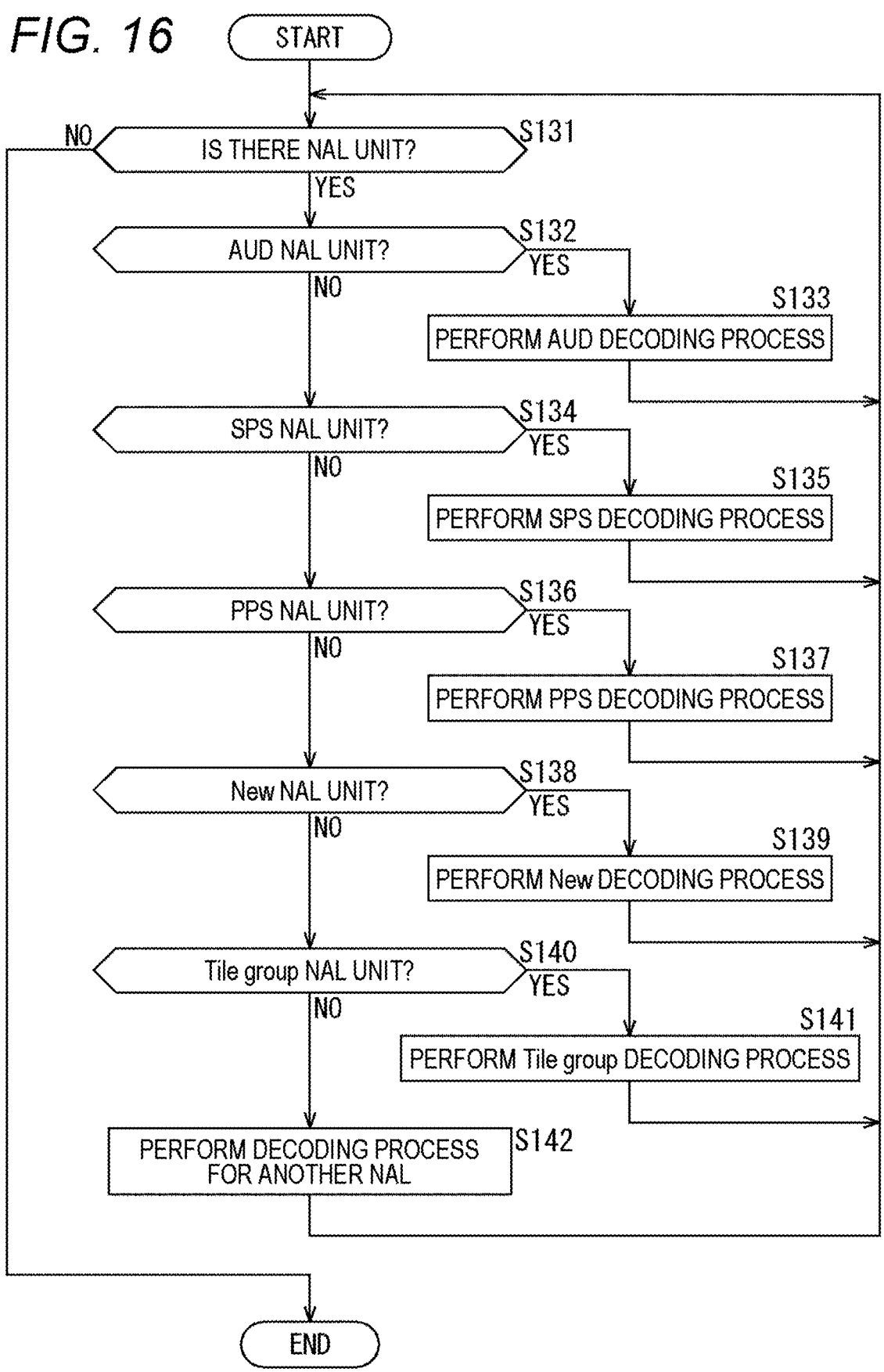
FIG. 16 is a flowchart explaining a NAL generation process in an image decoding process.
Figure 17:
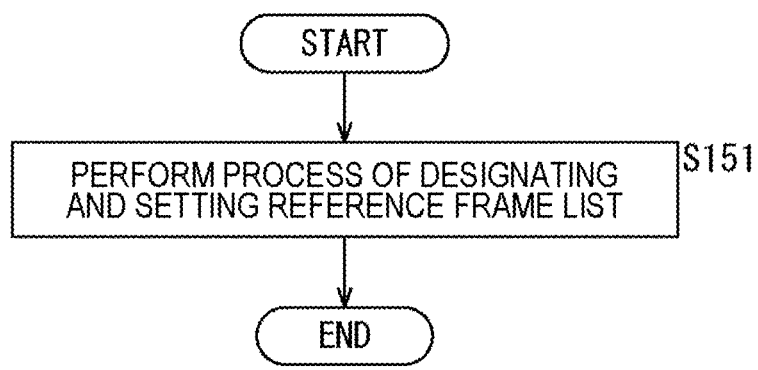
FIG. 17 is a flowchart explaining a NEW decoding process.

FIG. 17 is a flowchart explaining the NEW decoding process performed in step S139 of FIG. 16.

In step S151, the decoding unit 34 acquires the reference image information from the NEW NAL unit, and decodes the NEW NAL unit by performing a process of designating and setting the reference frame list in accordance with the reference image information. Subsequently, the NEW decoding process is ended.

Note that a tile group decoding process performed in step S141 of FIG. 16 is performed similarly to the tile group decoding process described above with reference to the flowchart in FIG. 11.

As described above, the image decoding device 30 can decode the image in accordance with the reference image information acquired from the NEW NAL unit, that is, decode an image of the bitstream made up of an access unit in which at least one or more NAL units are arranged.

<Second Mode of Bitstream>

A second mode of the bitstream will be described with reference to FIGS. 18 to 26.

In the second mode of the bitstream, a long-term reference, which can be set irregularly, can be modified dynamically.

Figure 18:
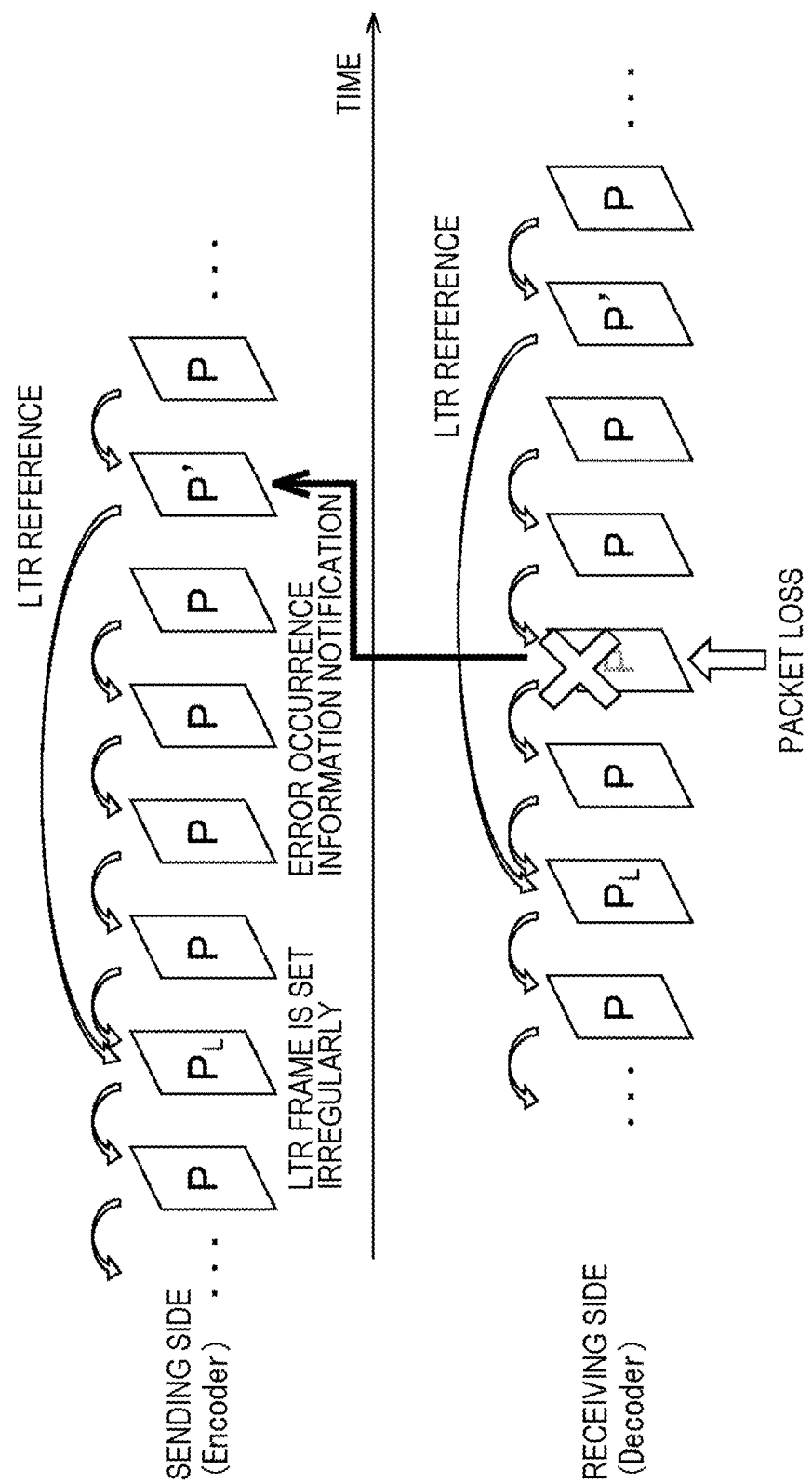
FIG. 18 is a diagram explaining a technique of recovering image quality in a narrow band using a long-term reference.

First, as an example of dynamically modifying the long-term reference, a technique of recovering image quality in a narrow band using the long-term reference will be described with reference to FIG. 18.

For example, in a case where a packet loss occurs at a timing as illustrated in the figure, the image decoding device 30, which is the receiving side, notifies the image encoding device 10, which is the sending side, of error occurrence information indicating that the packet loss has occurred. Then, the image encoding device 10 refers to a long-term reference picture (LTR frame $P_L$) to encode a frame P' that is to be encoded after receiving the error occurrence information, by avoiding resending the I-Picture.

Generally, the long-term reference picture is set (updated) irregularly when the movement is relatively large. For example, a short-term reference picture is encoded in a fixed group-of-pictures (GOP) structure and thus does not need to be modified, while it is possible to choose whether or not the long-term reference picture is modified when the picture is encoded.

By dynamically modifying the long-term reference in this manner, even if a packet loss has occurred, the image decoding device 30 can recover from the deterioration of image quality due to the packet loss with lower latency by referring to the LTR frame $P_L$ to decode the frame P' encoded by referring to the LTR frame $P_L$.

As a use case for using such a technique of recovering the image quality using the long-term reference, for example, a low-latency or interactive application with a limited transmission band is supposed. Specifically, the technique can be used in surveillance cameras, video chats, streaming game services, and the like.

A first variation of the second mode of the bitstream will be described with reference to FIGS. 19 and 20.

As illustrated in FIG. 19, the bitstream is constituted by a plurality of access units similarly to the case described above with reference to FIG. 4, and at least one or more NAL units (the AUD NAL unit, the SPS NAL unit, the PPS NAL unit, and the tile group NAL unit) are arranged in each access unit. Furthermore, similarly to the first variation of the first mode of the bitstream (see FIG. 4), three cases as illustrated in FIG. 19 are supposed as the configuration of the bitstream.

Then, in the first variation of the second mode of the bitstream, in any of the first to third cases, the AUD NAL unit is extended such that only the setting for the long term can be independently modified (modify poc_lsb_lt of ref_pic_list_struct(i, ref_pic_list_idx[i]).

Specifically, in the first variation of the second mode of the bitstream, the syntax of SPS NAL and AUD NAL is described as illustrated in FIG. 20.

For example, a modification on the long term of ref_pic_list_struct already defined in the SPS NAL unit is enabled in the AUD NAL unit.

A second variation of the second mode of the bitstream will be described with reference to FIGS. 21 and 22.

As illustrated in FIG. 21, the bitstream is constituted by a plurality of access units similarly to the case described above with reference to FIG. 4, and at least one or more NAL units (the AUD NAL unit, the SPS NAL unit, the PPS NAL unit, the tile group NAL unit, and the NEW NAL unit) are arranged in each access unit. Furthermore, similarly to the second variation of the first mode of the bitstream (see FIG. 12), three cases as illustrated in FIG. 21 are supposed as the configuration of the bitstream.

Then, in the second variation of the second mode of the bitstream, in any of the first to third cases, the NEW NAL unit is extended such that only the setting for the long term can be independently modified (modify poc_lsb_lt of ref_pic_list_struct(i, ref_pic_list_idx[i]).

Specifically, in the second variation of the second mode of the bitstream, the syntax of SPS NAL and NEW NAL is described as illustrated in FIG. 22.

For example, a modification on the long term of ref_pic_list_struct already defined in the SPS NAL unit is enabled in the NEW NAL unit.

An example of a reference frame list designation and setting process performed in the image encoding process executed by the image encoding device 10 will be described with reference to the flowchart illustrated in FIG. 23.

For example, when an image sequence is supplied to the image encoding device 10, a reference frame list setting process is started, and in step S161, the encoding unit 11 determines whether or not to designate the reference frame list already defined in the SPS NAL unit.

In a case where it is determined in step S161 that the reference frame list already defined in the SPS NAL unit is designated, the process proceeds to step S162, and the encoding unit 11 acquires the index of the reference frame list.

In step S163, the encoding unit 11 determines whether or not to modify long-term reference frame information, in accordance with the index of the reference frame list acquired in step S162.

In a case where the encoding unit 11 determines in step S163 that the long-term reference frame information is to be modified, the process proceeds to step S164, and a long-term reference frame information modification process (see the flowchart in FIG. 24 described later) is performed.

On the other hand, in a case where it is determined in step S163 that the long-term reference frame information is not to be modified, or after the long-term reference frame information modification process is performed in step S164, the reference frame list setting process is ended.

Meanwhile, in a case where it is determined in step S161 that the reference frame list already defined in the SPS NAL unit is not designated, the process proceeds to step S165. In step S165, the encoding unit 11 performs an encoding process for the reference frame list, and subsequently, the reference frame list designation and setting process is ended.

Figure 23:
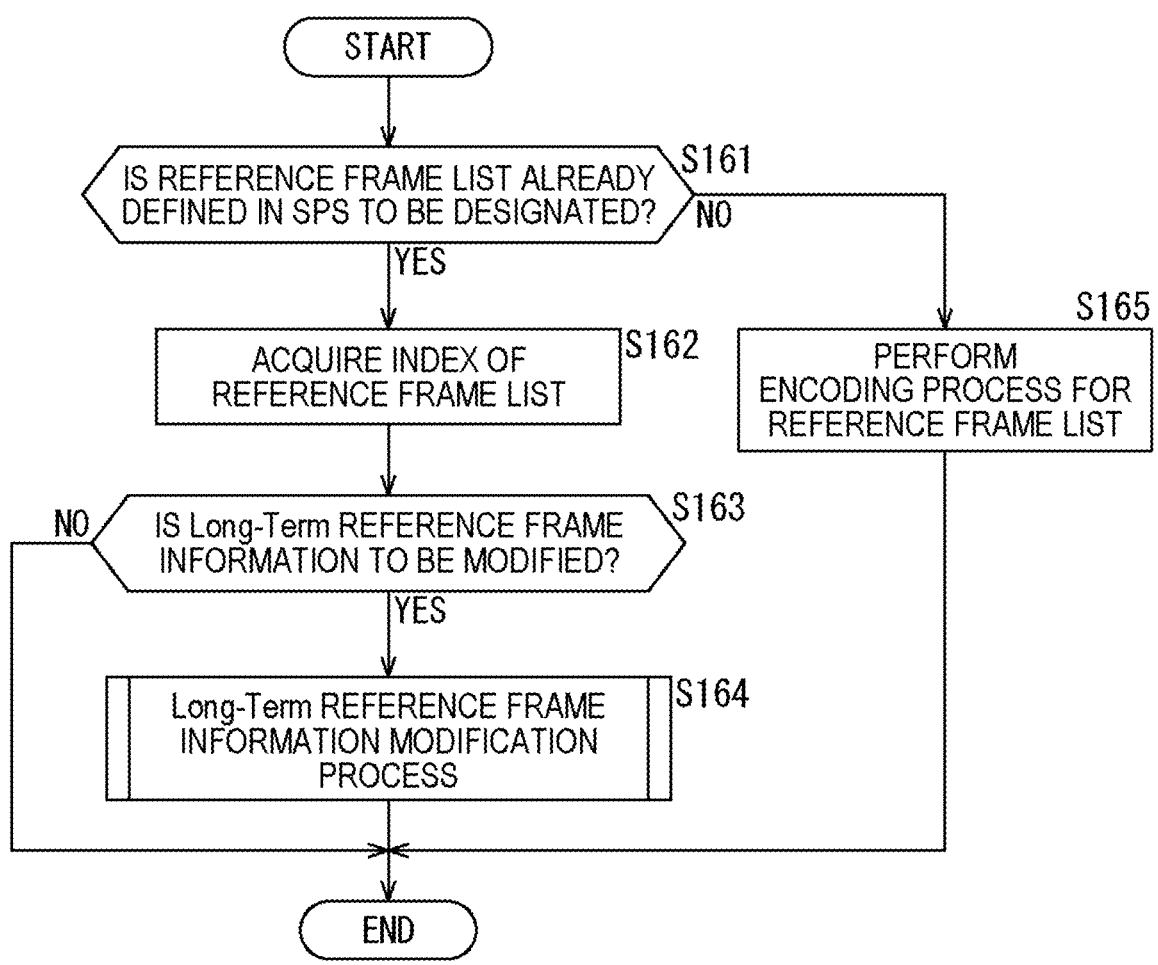
FIG. 23 is a flowchart explaining a reference frame list designation and setting process of an image encoding process.
Figure 24:
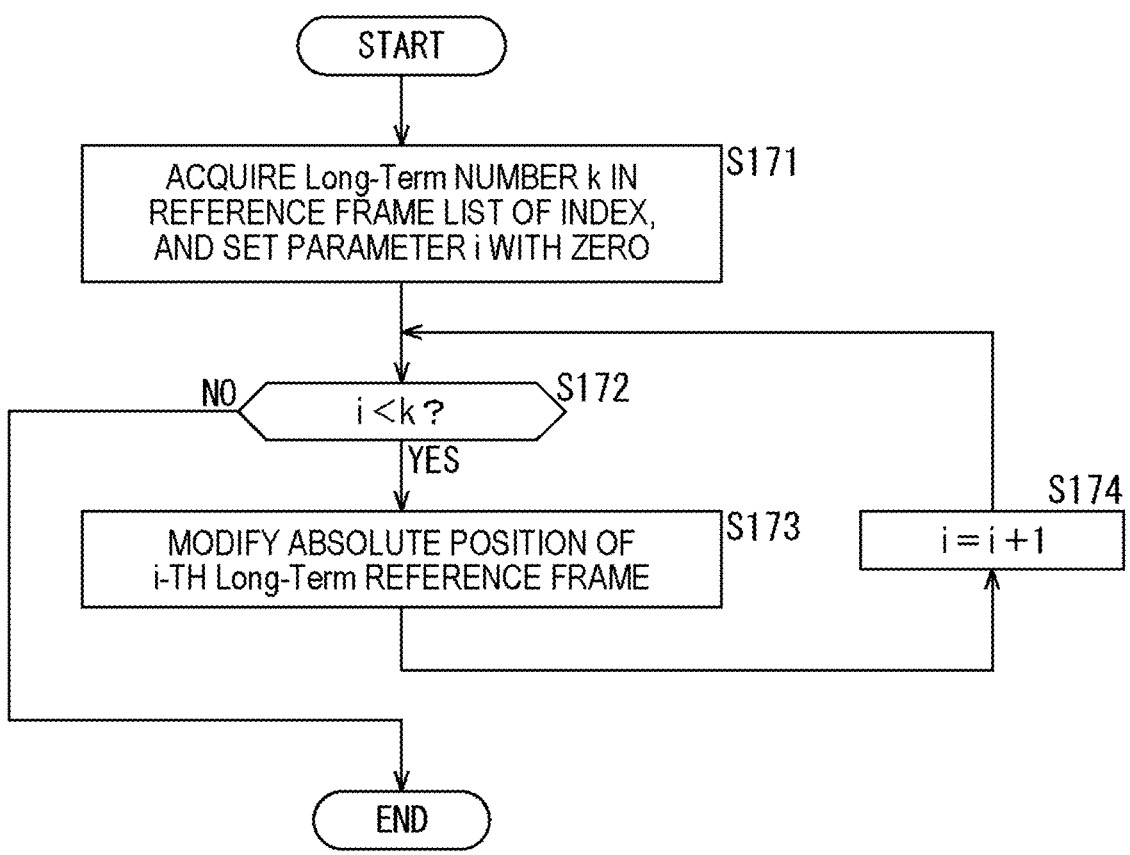
FIG. 24 is a flowchart explaining a long-term reference frame information modification process.

FIG. 24 is a flowchart explaining the long-term reference frame information modification process performed in step S164 of FIG. 23.

In step S171, the encoding unit 11 acquires a long-term number k in the reference frame list of the index acquired in step S162 of FIG. 23, and sets a parameter i with zero (i=0).

In step S172, the encoding unit 11 determines whether or not the parameter i is less than the long-term number k.

In a case where the encoding unit 11 determines in step S172 that the parameter i is less than the long-term number k (i<k), the process proceeds to step S173.

In step S173, the encoding unit 11 modifies the absolute position of an i-th long-term reference frame. For example, the encoding unit 11 can set the absolute position of the i-th long-term reference frame on the basis of a command (information that specifies the reference image) from the image decoding device 30. Furthermore, the image decoding device 30 updates the information that specifies the reference image, per frame.

In step S174, the encoding unit 11 increments the parameter i (i=i+1), and subsequently, the process returns to step S172.

On the other hand, in a case where the encoding unit 11 determines in step S172 that the parameter i is not less than the long-term number k (i k), the long-term reference frame information modification process is ended.

By the reference frame list designation and setting process as described above, the image encoding device 10 can modify the long-term reference frame information, and generate a moving image file made up of the bitstream as described above with reference to FIG. 19 or 21.

An example of a reference frame list designation and setting process performed in the image decoding process executed by the image decoding device 30 will be described with reference to the flowchart illustrated in FIG. 25.

For example, when the image decoding device 30 reads out a bitstream stored in the storage unit 20, the process is started, and in step S181, the decoding unit 34 determines whether or not to designate the reference frame list already defined in the SPS NAL unit.

In a case where it is determined in step S181 that the reference frame list already defined in the SPS NAL unit is designated, the process proceeds to step S182, and the decoding unit 34 acquires the index of the reference frame list.

In step S183, the decoding unit 34 determines whether or not to modify long-term reference frame information, in accordance with the index of the reference frame list acquired in step S182.

In a case where the decoding unit 34 determines in step S183 that the long-term reference frame information is to be modified, the process proceeds to step S184, and a long-term reference frame information modification process (see the flowchart in FIG. 26 described later) is performed.

On the other hand, in a case where it is determined in step S183 that the long-term reference frame information is not to be modified, or after the long-term reference frame information modification process is performed in step S184, the reference frame list setting process is ended.

Meanwhile, in a case where it is determined in step S181 that the reference frame list already defined in the SPS NAL unit is not designated, the process proceeds to step S185. In step S185, the decoding unit 34 performs a decoding process for the reference frame list, and subsequently, the reference frame list designation and setting process is ended.

Figure 25:
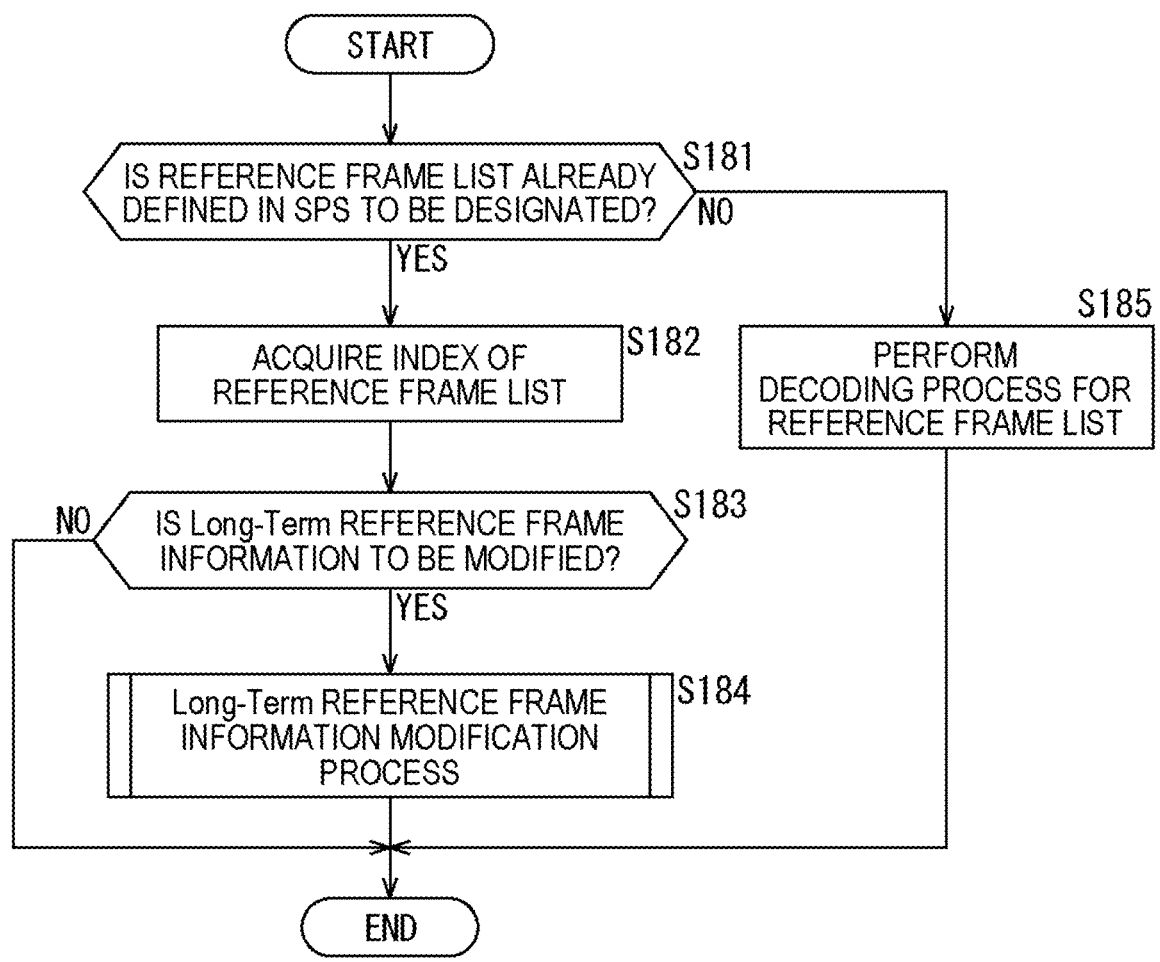
FIG. 25 is a flowchart explaining a reference frame list designation and setting process of an image decoding process.
Figure 26:
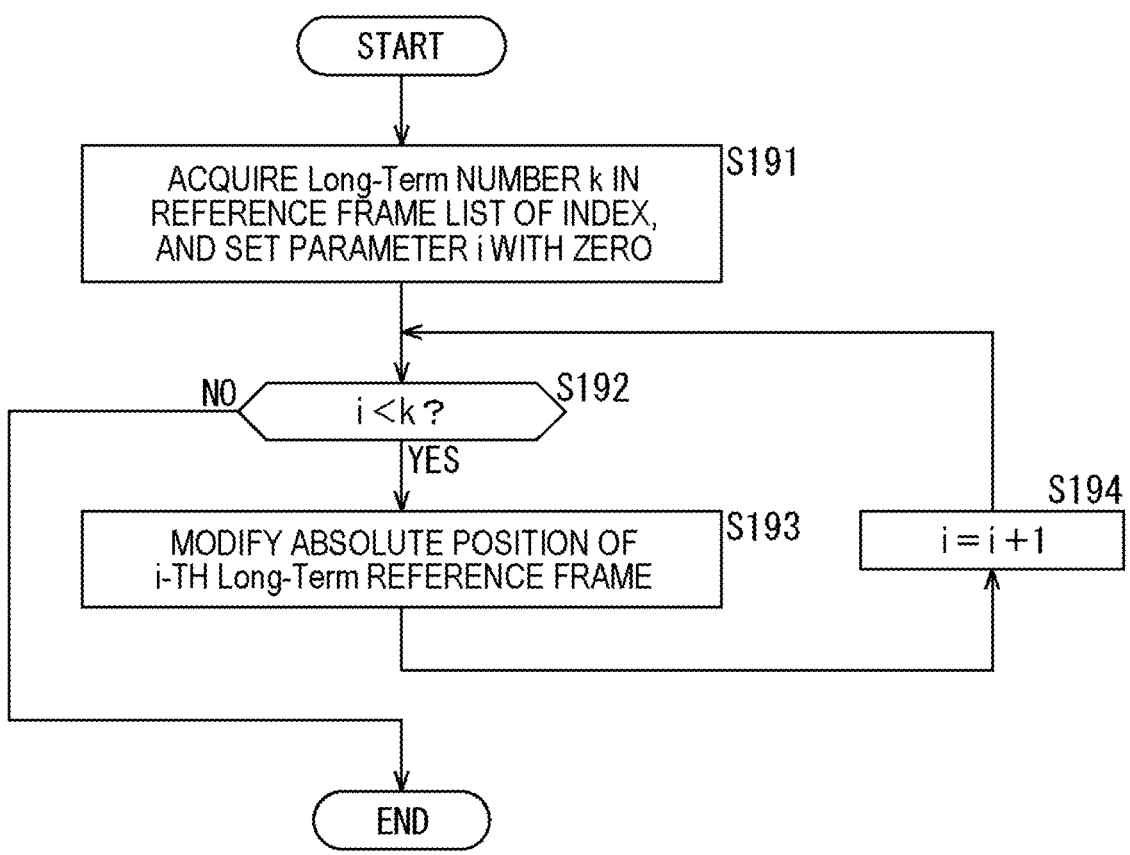
FIG. 26 is a flowchart explaining a long-term reference frame information modification process.

FIG. 26 is a flowchart explaining the long-term reference frame information modification process performed in step S184 of FIG. 25.

In step S191, the decoding unit 34 acquires the long-term number k in the reference frame list of the index acquired in step S182 of FIG. 25, and sets a parameter i with zero (i=0).

In step S192, the decoding unit 34 determines whether or not the parameter i is less than the long-term number k.

In a case where the decoding unit 34 determines in step S192 that the parameter i is less than the long-term number k (i<k), the process proceeds to step S193.

In step S193, the decoding unit 34 modifies the absolute position of an i-th long-term reference frame in accordance with the long-term reference frame information.

In step S194, the decoding unit 34 increments the parameter i (i=i+1), and subsequently, the process returns to step S192.

On the other hand, in a case where the decoding unit 34 determines in step S192 that the parameter i is not less than the long-term number k (i k), the long-term reference frame information modification process is ended.

By the reference frame list designation and setting process as described above, the image decoding device 30 can decode the image in accordance with the long-term reference frame information modified in a moving image file made up of the bitstream as described above with reference to FIG. 19 or 21.

<Exemplary Configuration of Computer>

Next, the series of processes (the image decoding method and the image encoding method) described above can be performed by hardware and also can be performed by software. In a case where the series of the processes are performed by software, a program constituting the software is installed in a general-purpose computer or the like.

Figure 27:
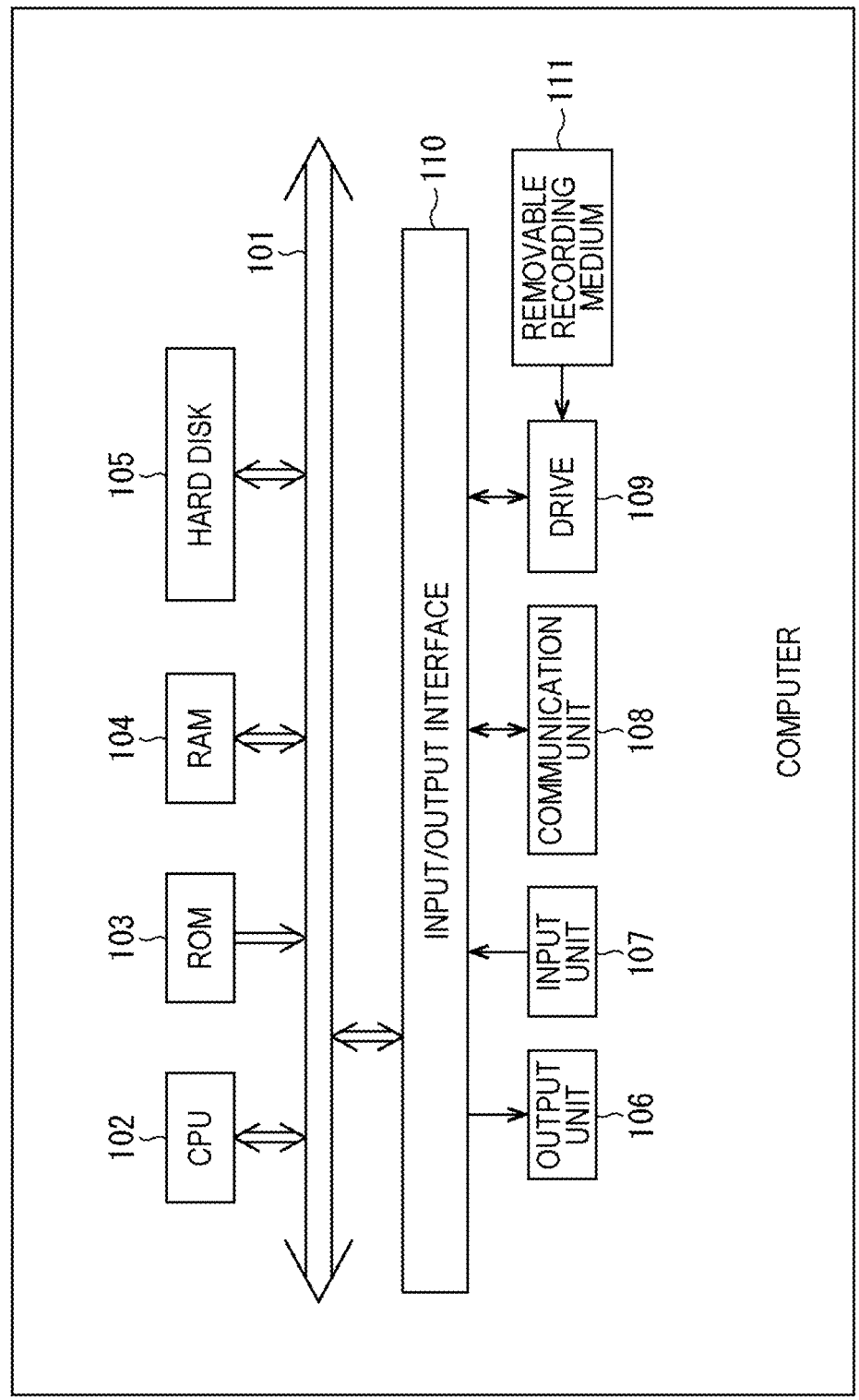
FIG. 27 is a block diagram illustrating an exemplary configuration of a computer according to an embodiment to which the present technology is applied.

FIG. 27 is a block diagram illustrating an exemplary configuration of a computer according to an embodiment on which a program that executes the above-described series of processes is installed.

The program can be pre-recorded on a hard disk 105 or a read only memory (ROM) 103 as a recording medium built in the computer.

Alternatively, the program can be saved (recorded) in a removable recording medium 111 driven by a drive 109. Such a removable recording medium 111 can be provided as so-called package software. Here, examples of the removable recording medium 111 include a flexible disk, a compact disc read only memory (CD-ROM), a magneto-optical (MO) disk, a digital versatile disc (DVD), a magnetic disk, and a semiconductor memory.

Note that the program not only can be installed on the computer from the removable recording medium 111 as described above, but also can be downloaded to the computer via a communication network or a broadcasting network to be installed on the built-in hard disk 105. That is, for example, the program can be transferred wirelessly from a download site to the computer via an artificial satellite for digital satellite broadcasting, or can be transferred to the computer by wire via a network such as a local area network (LAN) or the Internet.

The computer has a built-in central processing unit (CPU) 102, and an input/output interface 110 is connected to the CPU 102 via a bus 101.

When an order is input via the input/output interface 110 in response to, for example, an operation on an input unit 107 by a user, the CPU 102 executes the program saved in the read only memory (ROM) 103 in accordance with the order. Alternatively, the CPU 102 loads the program saved in the hard disk 105 into a random access memory (RAM) 104 and executes the loaded program.

This causes the CPU 102 to perform processes in accordance with the above-described flowcharts or processes performed with the configurations in the above-described block diagrams. Then, the CPU 102 outputs the results of the processes from an output unit 106 or sends the results from a communication unit 108 as necessary, for example, via the input/output interface 110, and additionally, records the results on the hard disk 105, for example.

Note that the input unit 107 is constituted by a keyboard, a mouse, a microphone, and the like. Furthermore, the output unit 106 is constituted by a liquid crystal display (LCD), a speaker, and the like.

Here, in the present description, the processes performed by the computer in accordance with the program do not necessarily have to be performed chronologically in the order described as the flowcharts. That is, the processes performed by the computer in accordance with the program include processes executed in parallel or individually (for example, parallel processes or processes by an object).

In addition, the program may be processed by a single computer (processor), or alternatively, may be processed by a plurality of computers in a distributed manner. Moreover, the program may be transferred to a remote computer and executed.

Additionally, in the present description, a system stands for a collection of a plurality of constituent members (e.g., devices and modules (parts)) and whether or not all the constituent members are placed within the same cabinet is not regarded as important. Accordingly, a plurality of devices accommodated in separate cabinets so as to be connected to one another via a network and one device of which a plurality of modules is accommodated within one cabinet are both deemed as systems.

Furthermore, for example, a configuration described as one device (or processing unit) may be partitioned so as to be configured as a plurality of devices (or processing units). Conversely, configurations described as a plurality of devices (or processing units) in the above may be collected so as to be configured as one device (or processing unit). In addition, as a matter of course, a configuration other than those described above may be added to the configurations of the respective devices (or processing units). Moreover, a part of the configuration of a certain device (or processing unit) may be included in the configuration of another device (or processing unit) as long as the configuration or the action of the system as a whole is maintained substantially unchanged.

Meanwhile, for example, the present technology can employ a cloud computing configuration in which one function is divided and allocated to a plurality of devices so as to be processed in coordination thereamong via a network.

In addition, for example, the above-described program can be executed by any device. In that case, that device is only required to have necessary functions (function blocks or the like) such that necessary information can be obtained.

Furthermore, for example, the respective steps described in the aforementioned flowcharts can be executed by a plurality of devices each taking a share thereof as well as executed by a single device. Moreover, in a case where a plurality of processes is included in one step, the plurality of processes included in one step can be executed by a plurality of devices each taking a share thereof as well as executed by a single device. In different terms, a plurality of processes included in one step can also be executed as processes in a plurality of steps. Conversely, the processes described as a plurality of steps can also be collected into one step and executed.

Note that the program executed by the computer may be designed in such a manner that the processes of steps describing the program are executed chronologically in the order described in the present description, or individually executed in parallel or at a necessary timing, for example, when called. In other words, as long as there is no inconsistency, the processes of the respective steps may be executed in an order different from the order described above. Moreover, these processes of the steps describing the program may be executed in parallel with a process of another program, or may be executed in combination with a process of another program.

Note that, as long as there is no inconsistency, each of a plurality of the present technologies described in the present description can be independently carried out alone. As a matter of course, it is also possible to carry out any plurality of the present technologies at the same time. For example, a part or the whole of the present technology described in any of the embodiments can also be carried out in combination with a part or the whole of the present technology described in another embodiment. In addition, a part or the whole of any one of the present technologies described above can also be carried out with another technology not mentioned above at the same time.

<Exemplary Combinations of Configurations>

Note that the present technology can be also configured as described below.

(1)

An image decoding device including a decoding unit that decodes an image of a bitstream made up of an access unit in which at least one or more network abstraction layer (NAL) units are arranged, in which reference image information indicating a reference image to be referred to by a current picture has been saved in a header region of the access unit.

(2)

The image decoding device according to (1) above, in which the reference image information has been saved in an access unit delimiter (AUD) NAL unit indicating a delimiter of the access unit, and is applied to all tile group NAL units in the access unit.

(3)

The image decoding device according to (1) above, in which the reference image information has been saved in the NAL unit for identification provided separately from an access unit delimiter (AUD) NAL unit indicating a delimiter of the access unit, and is applied to all tile group NAL units in the access unit.

(4)

The image decoding device according to any one of (1) to (3) above, in which the reference image information includes long-term information indicating whether or not the reference image is assigned as a long-term reference picture.

(5)

The image decoding device according to (4) above, in which the long-term information includes information that specifies the reference image chosen on the basis of information from a client that is a receiving side of the bitstream.

(6)

The image decoding device according to (5) above, in which the information from the client is updated per frame.

(7)

The image decoding device according to any one of (4) to (6) above, in which the long-term information has been saved in an access unit delimiter (AUD) NAL unit indicating a delimiter of the access unit, and is applied to all tile group NAL units in the access unit.

(8)

The image decoding device according to any one of (4) to (6) above, in which the long-term information has been saved in the NAL unit for identification provided separately from an access unit delimiter (AUD) NAL unit indicating a delimiter of the access unit, and is applied to all tile group NAL units in the access unit.

(9)

An image decoding method including decoding, by an image decoding device that performs an image decoding process, an image of a bitstream made up of an access unit in which at least one or more network abstraction layer (NAL) units are arranged, in which reference image information indicating a reference image to be referred to by a current picture has been saved in a header region of the access unit.

(10)

An image encoding device including an encoding unit that encodes an image of a bitstream made up of an access unit in which at least one or more network abstraction layer (NAL) units are arranged, in which reference image information indicating a reference image to be referred to by a current picture is saved in a header region of the access unit.

(11)

The image encoding device according to (10) above, in which the reference image information is saved in an access unit delimiter (AUD) NAL unit indicating a delimiter of the access unit, and is applied to all tile group NAL units in the access unit.

(12)

The image encoding device according to (10) above, in which the reference image information is saved in the NAL unit for identification provided separately from an access unit delimiter (AUD) NAL unit indicating a delimiter of the access unit, and is applied to all tile group NAL units in the access unit.

(13)

The image encoding device according to any one of (10) to (12) above, in which the reference image information includes long-term information indicating whether or not the reference image is assigned as a long-term reference picture.

(14)

The image encoding device according to (13) above, in which the long-term information includes information that specifies the reference image chosen on the basis of information from a client that is a receiving side of the bitstream.

(15)

The image encoding device according to (14) above, in which the information from the client is updated per frame.

(16)

The image encoding device according to any one of (13) to (15) above, in which the long-term information is saved in an access unit delimiter (AUD) NAL unit indicating a delimiter of the access unit, and is applied to all tile group NAL units in the access unit.

(17)

The image encoding device according to any one of (13) to (15) above, in which the long-term information is saved in the NAL unit for identification provided separately from an access unit delimiter (AUD) NAL unit indicating a delimiter of the access unit, and is applied to all tile group NAL units in the access unit.

(18)

An image encoding method including encoding, by an image encoding device that performs an image encoding process, an image of a bitstream made up of an access unit in which at least one or more network abstraction layer (NAL) units are arranged, in which reference image information indicating a reference image to be referred to by a current picture is saved in a header region of the access unit.

Note that the present embodiments are not limited to the aforementioned embodiments and a variety of modifications can be made without departing from the scope of the present disclosure. Furthermore, the effects described in the present description merely serve as examples and not construed to be limited. There may be another effect.

REFERENCE SIGNS LIST

10 Image encoding device
11 Encoding unit
12 Determination unit
13 VCL buffer
14 Non-VCL buffer
15 File generation unit
16 Control unit
20 Storage unit
30 Image decoding device
31 VCL buffer
32 Non-VCL buffer
33 Parameter memory
34 Decoding unit
35 Output buffer
37 Control unit

The invention claimed is:

1. An image decoding device comprising
a decoder that decodes an image of a bitstream made up of an access unit in which at least two or more network abstraction layer (NAL) units are arranged, wherein
reference image information, indicating one or more reference images to be referred to by a current picture, is included in a header region of the access unit,
the reference image information is provided separately from an access unit delimiter (AUD) NAL unit indicating a delimiter of the access unit, and is applied to all tile group NAL units in the access unit, and
the reference image information includes information related to a list of images to include the reference image to be referred to by the current picture.

2. The image decoding device according to claim 1, wherein
the reference image information further includes information for modifying long-term reference frame information, corresponding to a long-term reference image of the one or more reference images.

3. The image decoding device according to claim 1, wherein
the reference image information includes long-term information indicating whether or not the reference image is assigned as a long-term reference picture.

4. The image decoding device according to claim 3, wherein
the long-term information includes information that specifies the reference image chosen on a basis of information from a client that is a receiving side of the bitstream.

5. The image decoding device according to claim 4, wherein
the information from the client is updated per frame.

6. The image decoding device according to claim 3, wherein
the long-term information further includes information for modifying long-term reference frame information, corresponding to a long-term reference image of the one or more reference images.

7. An image decoding method by an image decoding device, the method comprising:
receiving a bitstream made up of an access unit in which at least two or more network abstraction layer (NAL) units are arranged; and
based on the access unit, decoding an image of the bitstream, wherein
reference image information, indicating one or more reference images to be referred to by a current picture, is included in a header region of the access unit.

8. The image decoding device according to claim 1, wherein
presence of the information related to the list of images is indicated by a dedicated flag bit located in the header region of the access unit.

9. The image decoding device according to claim 2, wherein
whether or not the long-term reference frame information is to be modified is indicated by a dedicated flag bit located in the header region of the access unit.

* * * * *